(12) United States Patent
Desai et al.

(10) Patent No.: US 10,931,426 B2
(45) Date of Patent: Feb. 23, 2021

(54) SYSTEM AND METHOD FOR SIDELINK FEEDBACK

(71) Applicant: Futurewei Technologies, Inc., Plano, TX (US)

(72) Inventors: Vipul Desai, Palatine, IL (US); Philippe Sartori, Algonquin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 111 days.

(21) Appl. No.: 16/059,998

(22) Filed: Aug. 9, 2018

(65) Prior Publication Data
US 2019/0052436 A1    Feb. 14, 2019

Related U.S. Application Data

(60) Provisional application No. 62/543,744, filed on Aug. 10, 2017.

(51) Int. Cl.
*H04W 76/14*    (2018.01)
*H04L 5/00*    (2006.01)
(Continued)

(52) U.S. Cl.
CPC .......... *H04L 5/0055* (2013.01); *H04L 1/1671* (2013.01); *H04L 1/18* (2013.01);
(Continued)

(58) Field of Classification Search
CPC ....... H04L 5/0055; H04L 1/1671; H04L 1/18; H04L 67/12; H04L 1/0026; H04L 1/1887;
(Continued)

(56) References Cited

U.S. PATENT DOCUMENTS

2016/0381666 A1    12/2016    Kim et al.
2017/0347394 A1    11/2017    Yasukawa et al.
(Continued)

FOREIGN PATENT DOCUMENTS

CN    102647261 A    8/2012
CN    105813204 A    7/2016
(Continued)

OTHER PUBLICATIONS

3GPP TS 36.212 V12.4.0; 3rd Generation Partnership Project; Technical Specification Group Radio Access Network; Evolved Universal Terrestrial Radio Access (E-UTRA); Multiplexing and channel coding (Release 12); Mar. 2015; 94 pages.
(Continued)

*Primary Examiner* — Walli Z Butt
(74) *Attorney, Agent, or Firm* — Slater Matsil, LLP

(57) ABSTRACT

In certain embodiments, a method includes, by a first mobile device, obtaining a data packet and determining, from a first set of resources, control resources for transmitting scheduling information associated with the data packet. The control resources include a physical sidelink control channel (PSCCH). The method includes determining, by the first mobile device from a second set of resources, acknowledgement (ACK)/negative acknowledgement (NACK) resources associated with the data packet and related to the control resources. The scheduling information includes transmission information for transmitting the data packet and an indication of the ACK/NACK resources. The method includes transmitting, by the first mobile device to a second mobile device, the scheduling information on the control resources and the data packet on a set of resources indicated by the transmission information and listening, by the first mobile device, for an ACK/NACK transmitted by the second mobile device on the ACK/NACK resources.

28 Claims, 12 Drawing Sheets

(51) Int. Cl.
  H04L 1/18 (2006.01)
  H04L 1/16 (2006.01)
  H04W 72/04 (2009.01)
  H04W 72/12 (2009.01)
  H04L 1/00 (2006.01)
  H04L 29/08 (2006.01)
  H04W 4/40 (2018.01)
  H04W 4/46 (2018.01)
  H04B 7/26 (2006.01)

(52) U.S. Cl.
  CPC ... H04W 72/0406 (2013.01); H04W 72/0446 (2013.01); H04W 72/121 (2013.01); H04W 76/14 (2018.02); H04B 7/2628 (2013.01); H04L 1/0026 (2013.01); H04L 1/1887 (2013.01); H04L 67/12 (2013.01); H04W 4/40 (2018.02); H04W 4/46 (2018.02)

(58) Field of Classification Search
  CPC ... H04L 5/0053; H04L 1/1896; H04L 1/1861; H04W 72/121; H04W 72/0446; H04W 72/0406; H04W 76/14; H04W 4/40; H04W 4/46; H04B 7/2628
  See application file for complete search history.

(56) References Cited

U.S. PATENT DOCUMENTS

| | | | |
|---|---|---|---|
| 2018/0116007 A1* | 4/2018 | Yasukawa | H04W 28/06 |
| 2018/0192397 A1 | 7/2018 | Seo | |
| 2018/0220280 A1* | 8/2018 | Baghel | H04L 1/1671 |
| 2018/0338319 A1* | 11/2018 | Kim | H04W 76/14 |
| 2019/0052411 A1* | 2/2019 | Chae | H04L 1/08 |
| 2019/0173612 A1* | 6/2019 | Kimura | H04W 56/001 |
| 2020/0077434 A1* | 3/2020 | Kim | H04W 4/46 |
| 2020/0267702 A1 | 8/2020 | Kim et al. | |

FOREIGN PATENT DOCUMENTS

| | | |
|---|---|---|
| CN | 106063352 A | 10/2016 |
| CN | 106165510 A | 11/2016 |
| WO | 2016076301 A1 | 5/2016 |
| WO | 2016107244 A1 | 7/2016 |
| WO | 2016163972 A1 | 10/2016 |
| WO | 2017007184 A1 | 1/2017 |
| WO | 2017075857 A1 | 5/2017 |
| WO | 2017126266 a1 | 7/2017 |
| WO | 2017127245 A1 | 7/2017 |

OTHER PUBLICATIONS

3GPP TS 36.212 V14.4.0; 3rd Generation Partnership Project; Technical Specification Group Radio Access Network; Evolved Universal Terrestrial Radio Access (E-UTRA); Multiplexing and channel coding (Release 14); Sep. 2017, 198 pages.

3GPP TS 36.213 V12.11.0; 3rd Generation Partnership Project; Technical Specification Group Radio Access Network; Evolved Universal Terrestrial Radio Access (E-UTRA); Physical layer procedures (Release 12); Lte Advanced, Sep. 2016, 241 pages.

3GPP TS 36.213 V14.7.0; 3rd Generation Partnership Project; Technical Specification Group Radio Access Network; Evolved Universal Terrestrial Radio Access (E-UTRA); Physical layer procedures (Release 14); Jun. 2018, 465 pages.

3GPP TS 36.321 V14.4.0; 3rd Generation Partnership Project; Technical Specification Group Radio Access Network; Evolved Universal Terrestrial Radio Access (E-UTRA); Medium Access Control (MAC) protocol specification (Release 14); Sep. 2017, 108 pages.

NEC, "Resource collision detection and handling", 3GPP TSG RAN WG1 Meeting #84bis, R1-162431, Apr. 11-15, 2016, 4 Pages, Busan, Korea.

* cited by examiner

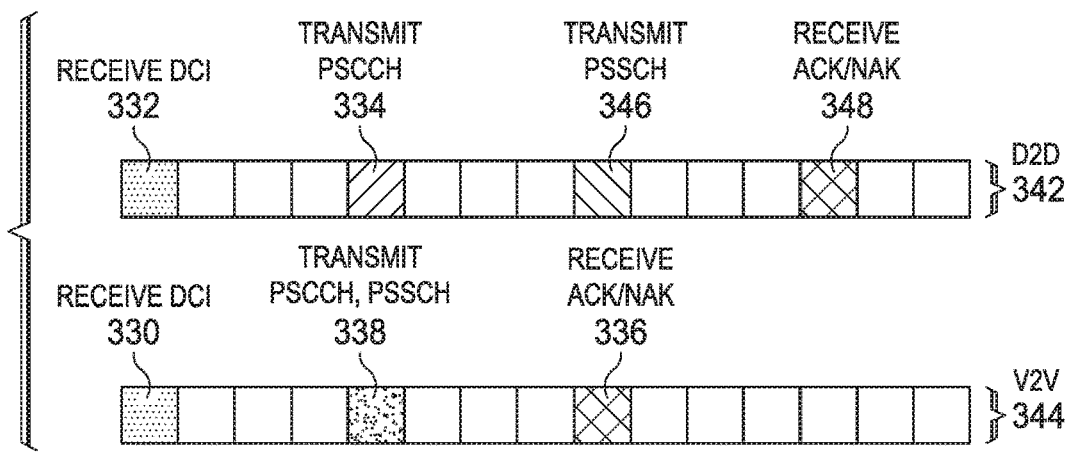
FIG. 14
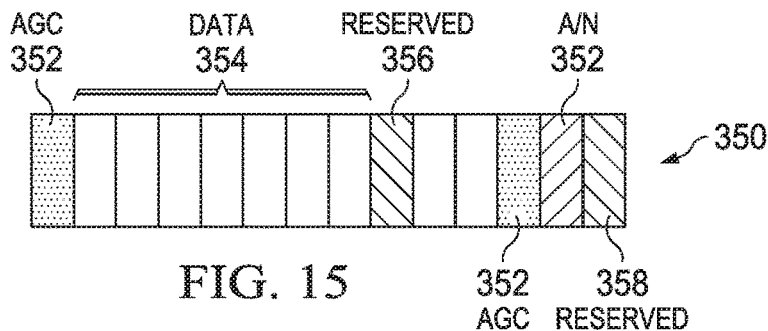
FIG. 15
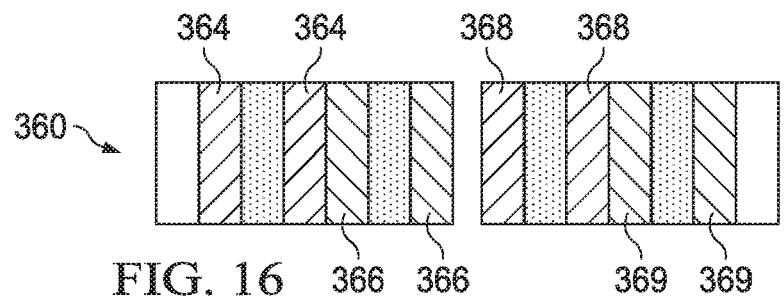
FIG. 16
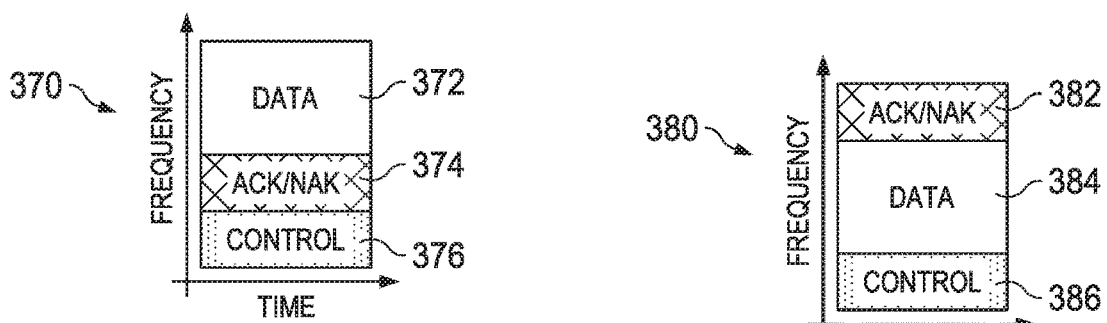
FIG. 17A
FIG. 17B

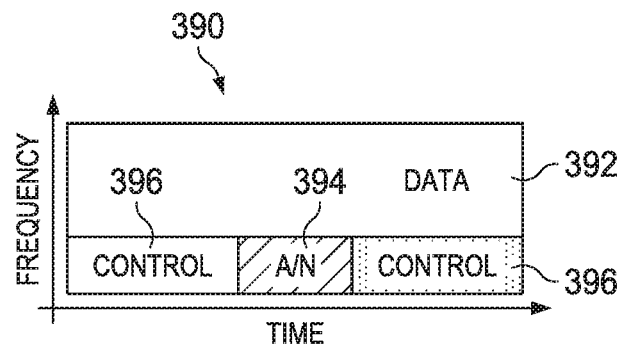
FIG. 18A
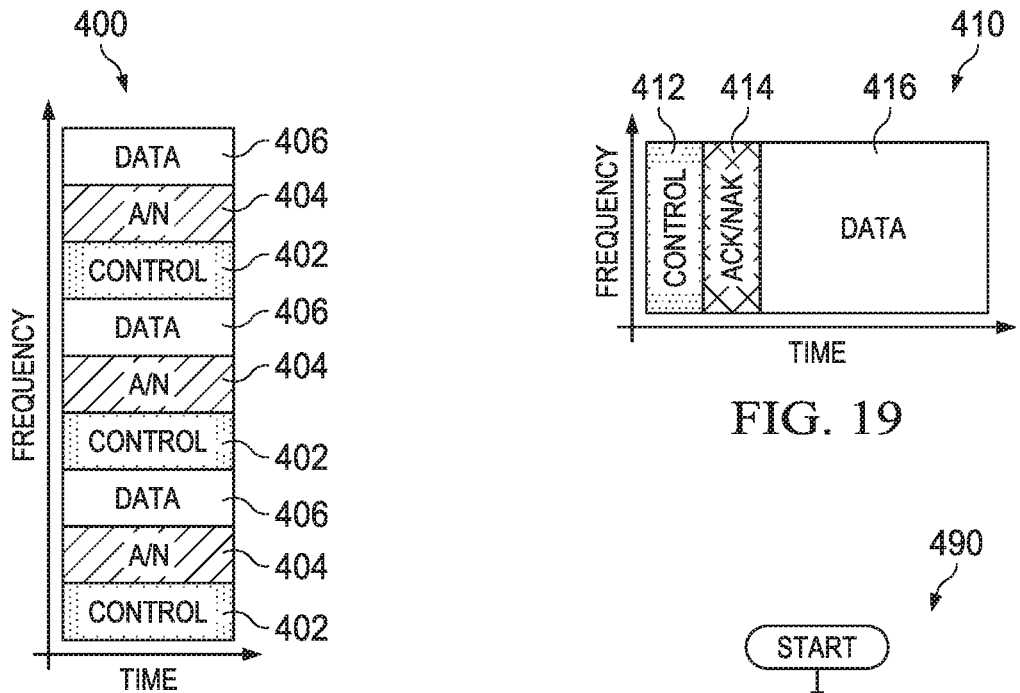
FIG. 18B
FIG. 19
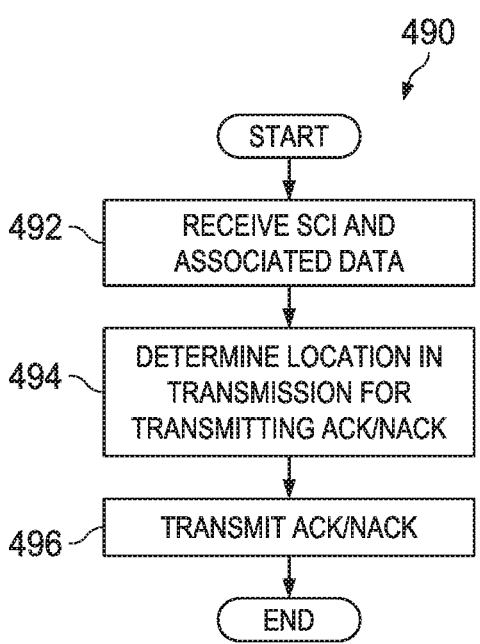
FIG. 20

SYSTEM AND METHOD FOR SIDELINK FEEDBACK

CROSS-REFERENCE TO RELATED APPLICATIONS

This application claims the benefit of U.S. Provisional Application No. 62/543,744, filed on Aug. 10, 2017, which is incorporated herein by reference.

TECHNICAL FIELD

The present disclosure relates generally to wireless communications, and, in particular embodiments, to a system and method for sidelink feedback.

BACKGROUND

Mobile devices in wireless communication networks communicate with one another in a variety of ways. For example, mobile devices may communicate with one another through one or more components located in the network, such as one or more base stations. Additionally or alternatively, mobile devices may communicate directly with one another. One wireless communication standard used today is the 3$^{rd}$ Generation Partnership Project (3GPP) Long-Term Evolution (LTE) standard, which provides multiple mechanisms by which mobile devices communicate. For example, in LTE a mobile device may receive data from a base station via a downlink interface. As another example, in LTE a mobile device may communicate data (e.g., for possible receipt by one or more other mobile devices) to a base station via an uplink interface. As another example, in LTE a mobile device may communicate directly with one or more other mobile devices via a sidelink interface.

SUMMARY

In certain embodiments, a method includes, by a first mobile device, obtaining a data packet and determining, from a first set of resources, control resources for transmitting scheduling information associated with the data packet. The control resources include a physical sidelink control channel (PSCCH). The method includes determining, by the first mobile device from a second set of resources, acknowledgement (ACK)/negative acknowledgement (NACK) resources associated with the data packet and related to the control resources. The scheduling information includes transmission information for transmitting the data packet and an indication of the ACK/NACK resources. The method includes transmitting, by the first mobile device to a second mobile device, the scheduling information on the control resources and the data packet on a set of resources indicated by the transmission information and listening, by the first mobile device, for an ACK/NACK transmitted by the second mobile device on the ACK/NACK resources.

In certain embodiments, the first mobile device is a vehicular user equipment (UE).

In certain embodiments, transmitting, by the first mobile device to the second mobile device, the scheduling information on the control channel comprises broadcasting, by the first mobile device, the scheduling information associated with the data packet on the PSCCH, the scheduling information being broadcast as sidelink control information (SCI).

In certain embodiments, transmitting the data packet on the set of resources indicated by the transmission information includes groupcasting the data packet to a group of mobile devices comprising the second mobile device.

Certain embodiments include counting a number of ACK/NACKs received on the ACK/NACK resources and retransmitting, based at least in part on the number of ACK/NACKs received and a number of mobile devices in the group of mobile devices, the data packet.

Certain embodiments include receiving, by the first mobile device from the second mobile device, an ACK or a NACK on the ACK/NACK resources; determining a group member identifier (ID) in accordance with the ACK or the NACK; and adding, based at least in part on examining the group member ID and a group member ID list, the group member ID to the group member ID list. Certain embodiments include resetting, in response to determining that the group member ID is on the group member ID list, a counter corresponding to the group member ID; decrementing a second counter corresponding to a second group member ID on the group member ID list; and removing, in response to the second counter reaching zero, the second group member ID from the group member ID list.

In certain embodiments, the scheduling information (e.g., the SCI message) includes an indicator that the first mobile device expects an acknowledgement, such as an ACK or NACK, to be transmitted by the second mobile device.

In certain embodiments, the second set of resources comprises an ACK/NACK pool; the set of resources indicated by the transmission information for transmitting the data packet comprises the physical sidelink shared channel (PSSCH); and determining, by the first mobile device from the second set of resources, the ACK/NACK resources associated with the data packet includes selecting the ACK/NACK resources from the ACK/NACK pool in accordance with a location of the PSCCH.

Certain embodiments include receiving, by the first mobile device from an eNodeB (eNB), a downlink control indicator (DCI) indicating the second set of resources, such as the ACK/NACK pool.

In certain embodiments, the transmission information for transmitting the data packet is retransmission information for retransmitting the data packet, and transmitting, by the first mobile device to the second mobile device, the data packet on the set of resources indicated by the transmission information includes retransmitting the data packet on the set of resources indicated by the retransmission information.

Certain embodiments include receiving the ACK/NACK transmitted by the second mobile device on the ACK/NACK resources, the ACK/NACK being an ACK, the ACK indicating reception of the data packet by the second mobile device.

In certain embodiments, the ACK/NACK resources are adjacent to or otherwise associated with a demodulation reference signal (DMRS).

In certain embodiments, the ACK/NACK resources are frequency division multiplexed (FDM) with a control channel and a data channel used by the second mobile device.

In certain embodiments, the ACK/NACK resources are time division multiplexed (TDM) on a control channel on the same frequency resources as the control channel.

In certain embodiments, the ACK/NACK resources are TDM with a control channel and a data channel.

In certain embodiments, the ACK/NACK resources are on a frequency sub-channel between a control channel and a data channel.

In certain embodiments, a method includes receiving, by a first mobile device from a second mobile device, scheduling information associated with a data packet on control resources. The control resources include a PSCCH. The scheduling information includes transmission information for transmitting the data packet by the second mobile device and including an indication of ACK/NACK resources associated with the data packet. The scheduling information includes SCI. The method includes receiving, by the first mobile device from the second mobile device, a data packet on resources indicated by the transmission information. The method includes transmitting, by the first mobile device to the second mobile device, an ACK or a NACK on the ACK/NACK resources, in response to determining to transmit the ACK or to transmit the NACK.

In certain embodiments, the first mobile device is a vehicular user equipment (UE).

Certain embodiments include determining the ACK/NACK resources in accordance with a location of the SCI.

In certain embodiments, the ACK or the NACK is a part of an indicator, and the indicator includes a first bit indicating an ACK or a NACK and a second bit indicating channel quality.

In certain embodiments, transmitting the ACK or the NACK includes transmitting a waveform, the waveform indicating the ACK or the NACK and channel quality.

Certain embodiments include determining the ACK/NACK resources in accordance with a mapping of a logical index of a resource of the SCI.

In certain embodiments, transmitting the ACK or the NACK on the ACK/NACK resources includes transmitting the ACK or the NACK pseudo-randomly on the ACK/NACK resources.

In certain embodiments, the method includes determining whether the data packet is broadcast or groupcast in accordance with the SCI; and transmitting, by the first mobile device to the second mobile device, the ACK or the NACK on the ACK/NACK resources, in response to determining to transmit the ACK or to transmit the NACK, includes transmitting the ACK or the NACK upon determining that the data packet is groupcast.

In certain embodiments, transmitting the ACK or the NACK includes transmitting the ACK or the NACK on a physical sidelink hybrid automatic repeat request (HARQ) indicator channel (PSHICH) in accordance with the scheduling information.

In certain embodiments, transmitting the ACK or the NACK includes transmitting the ACK or the NACK using a code division multiple access (CDMA) code associated with a group member ID of the first mobile device.

In certain embodiments, the ACK or the NACK is transmitted on resources using a cover code identifying the first mobile device.

In certain embodiments, the first mobile device transmits the ACK or the NACK using open-loop power control in accordance with a power level of the SCI received from the second mobile device or a power level of the data packet received from the second mobile device.

Certain embodiments include receiving, by the first mobile device from a third mobile device, a second data packet; and determining to transmit the ACK or the NACK before transmitting a second ACK or NACK corresponding to the second data packet, in accordance with a priority level of the data packet, a power level of the data packet, or a latency requirement for the data packet.

Certain embodiments include extracting a group ID from the SCI; adding, in response to determining that the group ID is not already on a list of group IDs, the group ID to the list of group IDs; resetting, in response to determining that the group ID is on the list of group IDs, a counter associated with the group ID; decrementing a second counter associated with a second group ID on the list of group IDs; and removing the second group ID from the list of group IDs in response to the second counter reaching zero.

Certain embodiments include extracting a group member ID from the SCI; adding, in response to determining that the group member ID is not on a group member ID list, the group member ID to the list of group member IDs associated with the group ID; resetting, in response to determining that the group member ID is on the list of group member IDs, a counter associated with the group member ID; decrementing a second counter associated with a second group member ID from the group member ID list; and removing the second group member ID from the group member ID list in response to the second counter reaching zero.

In certain embodiments, a mobile device includes one or more processors and a non-transitory memory storage storing instructions. The instructions are configured to, when executed by the one or more processors, cause the one or more processors to perform operations that include obtaining a data packet and determining, from a first set of resources, control resources for transmitting scheduling information associated with the data packet. The control resources include a physical sidelink control channel (PSCCH). The operations further include determining, by the first mobile device from a second set of resources, acknowledgement (ACK)/negative acknowledgement (NACK) resources associated with the data packet and related to the control resources. The scheduling information includes transmission information for transmitting the data packet and an indication of the ACK/NACK resources. The operations further include transmitting, to a second mobile device, an SCI associated with the data packet on a PSCCH. The SCI indicates the ACK/NACK resources associated with the data packet. The operations further include transmitting, by the first mobile device to a second mobile device, the scheduling information on the control resources and the data packet on a set of resources indicated by the transmission information and listening, by the first mobile device, for an ACK/NACK transmitted by the second mobile device on the ACK/NACK resources.

The foregoing has outlined features of certain embodiments of the present disclosure in order that the detailed description that follows may be better understood. Additional features and advantages of embodiments of the disclosure will be described, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 14 illustrates an example sequence of frames for device-to-device (D2D) communication and an example sequence of frames for V2V communication, according to certain embodiments of the present disclosure;

FIG. 15 illustrates an example sequence of frames in new radio (NR), according to certain embodiments of the present disclosure;

FIG. 16 illustrates an example frame structure in which ACK/NACKs are placed around demodulation reference signals (DMRSs), according to certain embodiments of the present disclosure;

FIGS. 17A-B illustrate examples of multiplexing of the ACK/NACK pool in the frequency domain, according to certain embodiments of the present disclosure;

FIGS. 18A-B illustrate example ACK/NACK pools, according to certain embodiments of the present disclosure;

FIG. 19 illustrates an example frame structure, according to certain embodiments of the present disclosure;

FIG. 20 illustrates a flowchart of an example method of ACK/NACK transmission performed by a destination mobile device, according to certain embodiments of the present disclosure;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
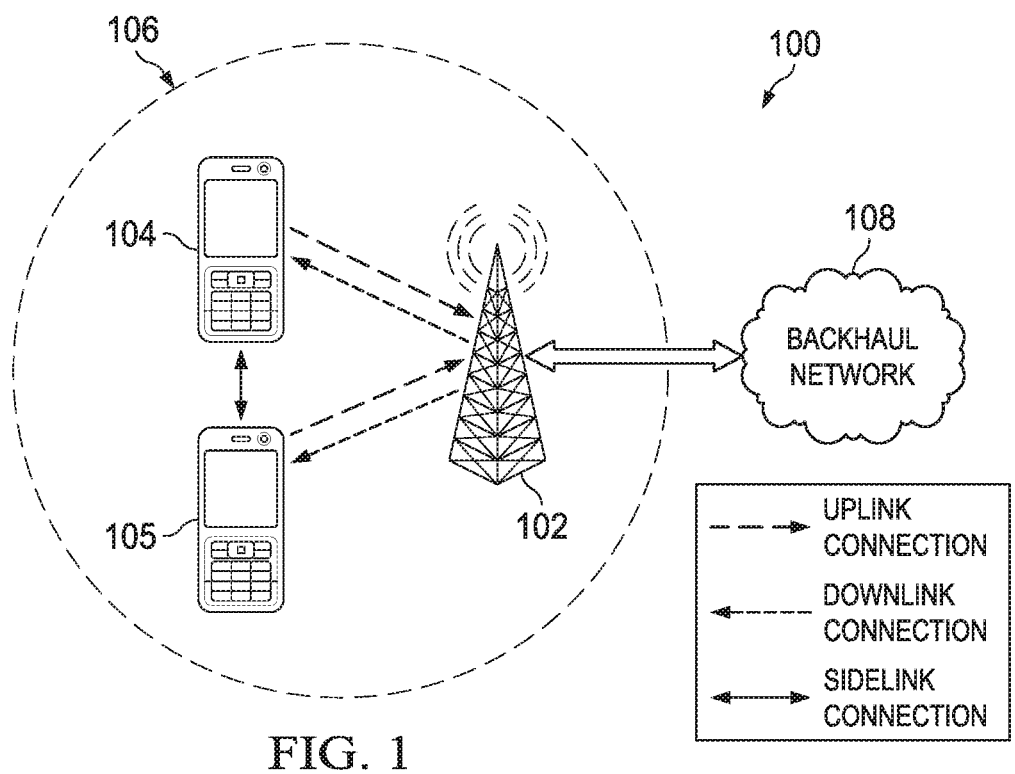
FIG. 1 illustrates a diagram of an example wireless network for communicating data, according to certain embodiments of the present disclosure.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

It may be desirable for mobile devices, such as user equipment (UEs), vehicles (e.g., vehicular UEs), or other types of mobile devices, to communicate directly with one another in a variety of situations. For example, where the mobile devices are non-vehicular UEs, direct communication between devices may be referred to as device-to-device (D2D) communications. As another example, where at least one of the mobile devices is a vehicle, direct communication between the vehicle and the other device (e.g., another vehicle, a non-vehicular UE, infrastructure, a pedestrian, the grid) may be referred to as vehicle-to-everything (V2X) communications. In the example in which both mobile devices are vehicles, direct communication often is referred to as vehicle-to-vehicle (V2V) communications. V2X may be considered a subset of D2D communications in which at least one of the mobile devices is a vehicle. For mobile devices that support communications according to the LTE standards, the mobile devices may communicate directly with one another using a sidelink interface.

In one specific example use case, V2V communications may be used in a platoon of multiple vehicles, where one or more trailing vehicles attempts to maintain a sufficiently safe distance from a preceding vehicle by mimicking the behavior of the preceding vehicle. For example, when the preceding vehicle is accelerating, the trailing vehicles also accelerate. While it may be possible for platooning to operate without communications between vehicles, additional information provided through communications between the vehicles may augment information from sensors (e.g., radar, proximity sensors, or other types of sensors) to allow higher densities and improvements in operation.

In D2D and V2V communication, communications from the mobile devices may include messages on a sidelink traveling from one UE to one or more other UEs without being transmitted through a base station (e.g., an E-UTRAN Node B, or eNB) or other type of network-side equipment, though it should be noted that in some scenarios involving sidelink communications a base station or other network-side equipment may be involved. Messages in D2D and V2V may be transmitted on a physical sidelink discovery channel (PSDCH), a physical sidelink shared channel (PSSCH), a physical sidelink control channel (PSCCH), a physical sidelink broadcast channel (PSBC), and on other signaling, such as primary sidelink synchronization signal (PSSS) or secondary sidelink synchronization signal (SSSS). In some scenarios, the sidelink may use uplink resources.

With D2D and V2V in LTE, transmission on the sidelink at the physical layer is via broadcasting of messages by a source mobile device without a priori knowledge of locations of potential recipient mobile devices. In addition to or as an alternative to the source mobile device broadcasting messages on the sidelink at the physical layer, embodiments of the present disclosure provide for using unicast or groupcast communication at the physical layer, which may improve sidelink communication. Embodiments of the present disclosure introduce a mechanism for providing feedback in sidelink transmissions without involving a centralized controller, such as a base station (e.g., an eNB). In certain embodiments, the ability to provide feedback in the context of sidelink transmissions (e.g., with D2D and V2V communication) may improve transmission reliability. Furthermore, certain embodiments allow for feedback without relying on uplink and downlink transmission between a centralized controller and a mobile device, which may free up the uplink and downlink resources, as well as controller processing resources, for use with other demands.

In certain embodiments, a method includes, by a first mobile device (e.g., a source mobile device), obtaining a data packet and determining, from a first set of resources, control resources for transmitting scheduling information associated with the data packet. The control resources include a physical sidelink control channel (PSCCH). The method includes determining, by the first mobile device from a second set of resources, acknowledgement (ACK)/negative acknowledgement (NACK) resources associated with the data packet and related to the control resources. The scheduling information includes transmission information for transmitting the data packet and an indication of the ACK/NACK resources. The method includes transmitting, by the first mobile device to a second mobile device (e.g., a destination mobile device), the scheduling information on the control resources and the data packet on a set of resources indicated by the transmission information. In certain embodiments, the transmission by the first mobile device of the scheduling information on the control resources is a broadcast transmission. In certain embodiments, the scheduling information may include or be communicated as sidelink control information (SCI). The method includes listening, by the first mobile device, for an ACK/NACK transmitted by the second mobile device on the ACK/NACK resources. The ACK or NACK communicated by the second mobile device to the first mobile device may be a communication directed from the second mobile device to the first mobile device using the ACK/NACK resources. In certain embodiments, scheduling the ACK/NACK resources may reduce or eliminate collisions.

In certain embodiments, a method includes receiving, by a first mobile device (e.g., a destination mobile device) from a second mobile device (e.g., a source mobile device), scheduling information associated with a data packet on control resources. The control resources may include a PSCCH. The scheduling information includes transmission information for transmitting the data packet by the second mobile device and including an indication of ACK/NACK resources associated with the data packet. The scheduling information includes SCI. In certain embodiments, the scheduling information received by the first mobile device on the control resources is a broadcast transmission from the second mobile device. The method includes receiving, by the first mobile device from the second mobile device, a data packet on resources indicated by the transmission information. For example, the first mobile device may receive the data packet a physical sidelink shared channel (PSSCH) indicated by the transmission information. The method includes transmitting, by the first mobile device to the second mobile device, an ACK or a NACK on the ACK/NACK resources, in response to determining to transmit the ACK or to transmit the NACK. The ACK or NACK communicated by the first mobile device to the second mobile device may be a communication directed from the second mobile device to the first mobile device using the ACK/NACK resources.

Although this description focuses primarily on embodiments in which the mobile devices are vehicular UEs (and the D2D communication is V2V communication), the present description contemplates the described techniques being equally applicable to D2D, V2V, V2E, and other suitable combinations of devices, regardless of whether specified in the description of particular embodiments. Furthermore, although described as mobile, the present disclosure contemplates the mobile devices being any suitable types of devices that are capable of sidelink communication.

FIG. 1 illustrates a diagram of an example wireless network 100 for communicating data, according to certain embodiments of the present disclosure. Network 100 includes a base station 102 having a coverage area 106, a plurality of mobile devices, including mobile device 104 and mobile device 105, and a backhaul network 108. In this embodiment, two mobile devices are depicted, but many more may be present. Base station 102 may be any component capable of providing wireless access by establishing uplink and/or downlink connections with mobile device 104 and/or mobile device 105, which serve to carry data from mobile devices 104 and/or 105 to base station 102 and vice versa. Data carried over the uplink/downlink connections may include data communicated between mobile device 104 and mobile device 105, as well as data communicated to/from a remote end by way of backhaul network 108. A sidelink connection between mobile device 104 and mobile device 105 also is shown. As discussed above, the sidelink connection provides a capability for mobile devices 104 and 105 to communicate directly with one another.

For purposes of this description, the term base station refers to any component (or collection of components) configured to provide wireless access to a network, such as a NodeB, an enhanced nodeB (eNB), a gNB, an access point, a picocell, a femtocell, macrocell, a Wi-Fi access point (AP), a relay node, and other wirelessly enabled devices. Base stations may provide wireless access in accordance with one or more wireless communication protocols, e.g., long term evolution (LTE), LTE advanced (LTE-A), High Speed Packet Access (HSPA), New Radio (NR), Wi-Fi 802.*na*/b/g/n/ac, etc.

Mobile device 104 and mobile device 105 may be any component (or collection of components) capable of establishing a wireless connection with base station 102, such as user equipment (UE), mobile stations (STAs), cell phones, smart phones, tablets, sensors, vehicles, and other wirelessly enabled devices. It should be understood that the term UE may include one or more of the types of devices listed above (e.g., a vehicular UE). In some embodiments, network 100 may include various other wireless devices, such as relays, low power nodes, and other types of wireless devices.

Figure 2A:
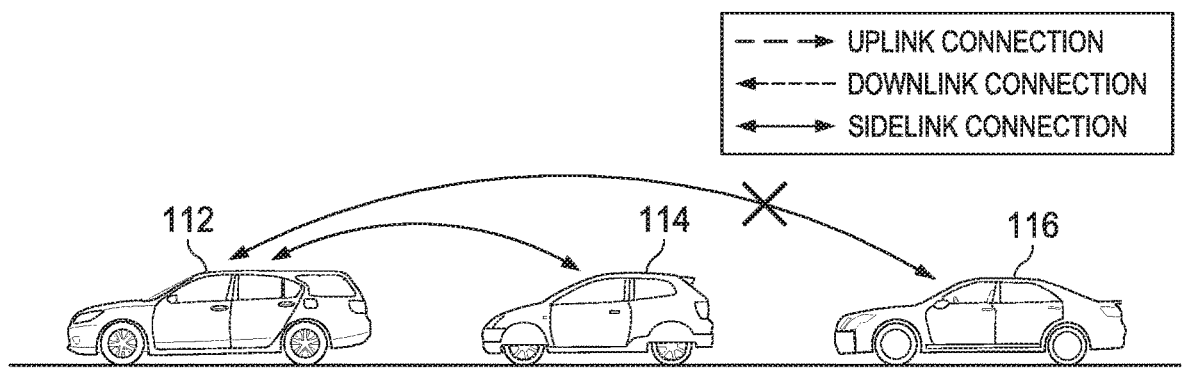
FIGS. 2A-C illustrate example vehicle-to-vehicle (V2V) communication, according to certain embodiments of the present disclosure.
Figure 2B:
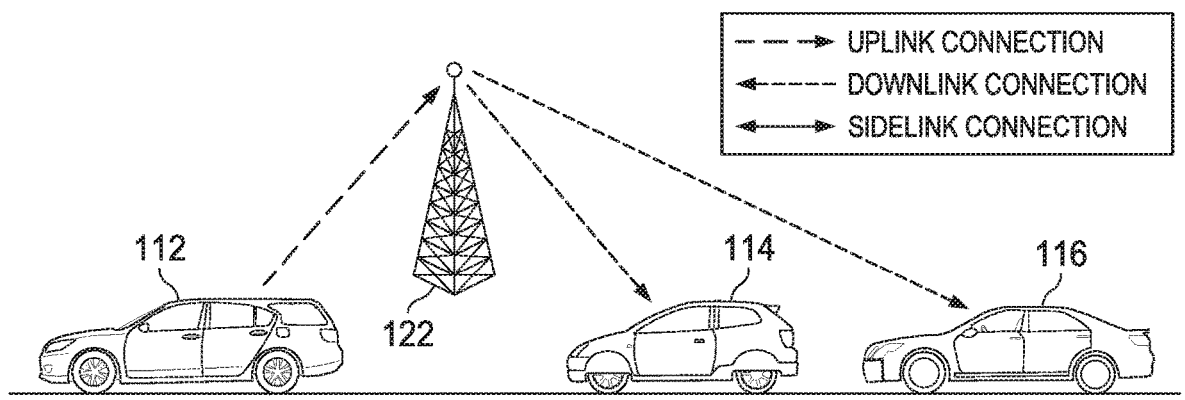
Figure 2C:
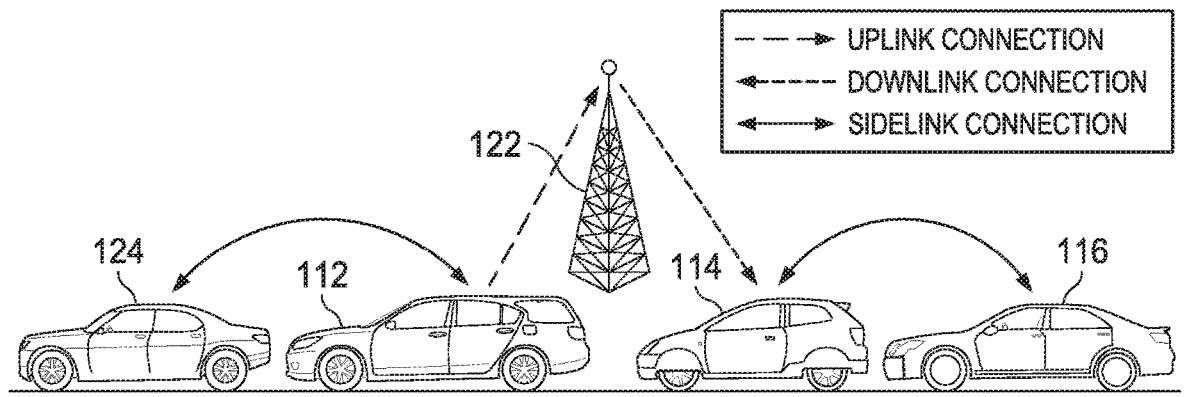

FIGS. 2A-C illustrate example V2V communication, according to certain embodiments of the present disclosure. In FIG. 2A, a vehicle 112 attempts sidelink communications with a vehicle 114 and a vehicle 116 by broadcasting a data packet. Vehicle 114 is within range of vehicle 112 and receives the data packet broadcast by vehicle 114. Vehicle 116, however, is out of range of vehicle 112, and vehicle 116 does not receive the data packet broadcast by vehicle 112.

In FIG. 2B, vehicle 112 performs network broadcast. In particular, vehicle 112 transmits a data packet in the uplink to a road side unit (RSU) 122. RSU 122 then forwards, or broadcasts, the data packet in the downlink to vehicle 114 and to vehicle 116. RSU 122 may combine or concatenate several uplink transmissions in the broadcast message. Hence, RSU 122 extends the V2V coverage beyond what is available in the sidelink.

FIG. 2C illustrates both direct V2V communications and network broadcasting. Vehicle 112 broadcasts a data packet, which is received by vehicle 124, which is in range of vehicle 112. Vehicle 114 and vehicle 116 are not in range of vehicle 112 and do not receive the data packet broadcast by vehicle 112. Vehicle 112, however, also transmits the data packet to RSU 122 in the uplink, for forwarding. RSU 122 then broadcasts the data packet received from vehicle 112. Vehicle 114 is in range of RSU 122 and receives the data packet broadcast by RSU 122. On the other hand, vehicle 116 is not in range of RSU 122, and vehicle 116 does not receive the data packet broadcast by RSU 122. Vehicle 114, however, also forwards, or broadcasts, the data packet received from RSU 122. Vehicle 116 is in range of vehicle 114, and vehicle 116 receives the data packet broadcast by vehicle 114.

Figure 3A:
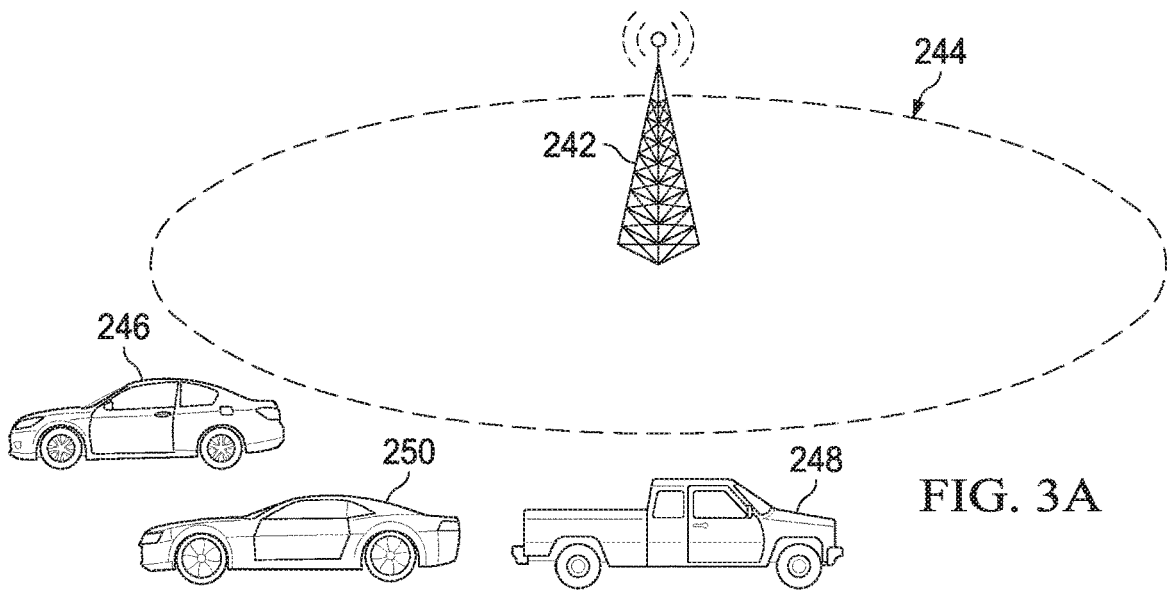
FIGS. 3A-C illustrate example vehicle coverage scenarios, according to certain embodiments of the present disclosure.
Figure 3B:
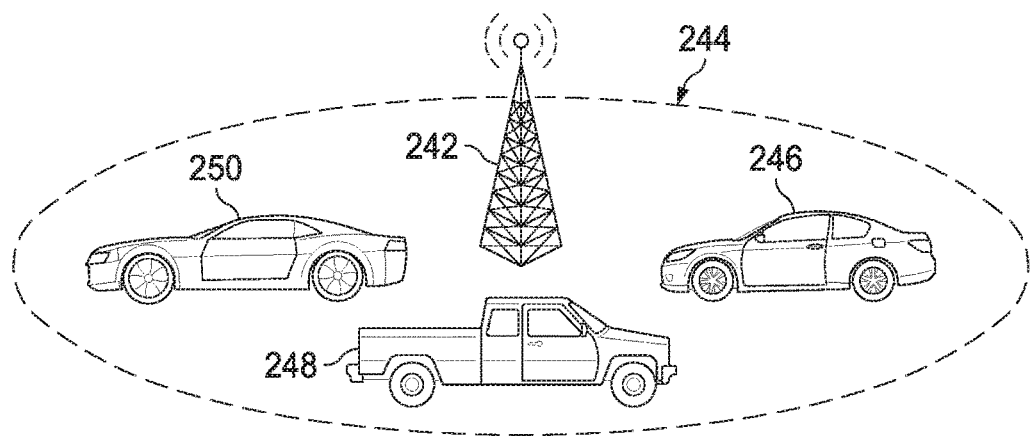
Figure 3C:
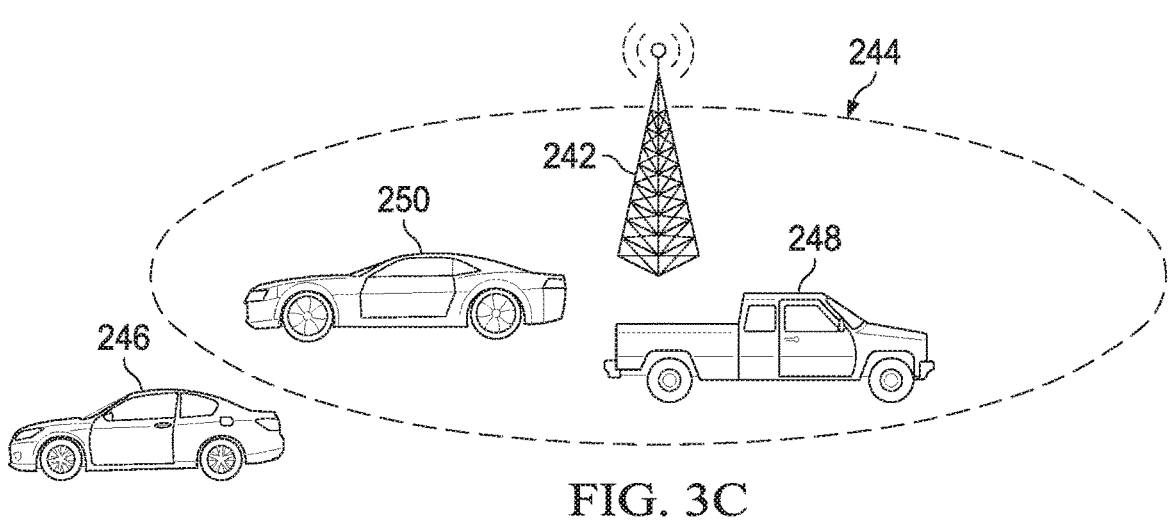

FIGS. 3A-C illustrate example vehicle coverage scenarios, according to certain embodiments of the present disclosure. In FIG. 3A, none of vehicles 246, 248, and 250 are within a coverage area 244 of base station 242 (e.g., an eNB). In FIG. 3B, all of vehicles 246, 248, and 250 are within coverage area 244 of base station 242. In FIG. 3C, vehicles 248 and 250 are within coverage area 244 of base station 242, and vehicle 246 is outside coverage area 244 of base station 242.

D2D, V2X, and V2V communications are expected to be expanded in the future, under both LTE and NR. Vehicular services, such as platooning and automated merging, are developing to facilitate a move toward autonomous cars. In platooning, one or more trailing vehicles attempt to maintain an acceptable distance from a preceding vehicle by mimicking the behavior of the preceding vehicle. Although platooning may operate without communication between vehicles, transmission of additional information may provide advantages, such as fuel savings and increased vehicle density.

Platooning may be achieved without V2V communications, where a trailing vehicle follows a lead vehicle or a preceding vehicle. For example, in adaptive cruise control (ACC), the sensors on a trailing vehicle monitor the dynamics of the preceding vehicle and provide inputs to a cruise control module, so the trailing vehicle can track the preceding vehicle. However, V2V communication, whether alone or when coupled with sensor input, may provide advantages. For example, communications from a preceding vehicle may provide additional information, such as the speed, direction, location, and acceleration, so the trailing vehicle may generate inputs for operation of the trailing vehicle. Additionally or alternatively, the trailing vehicle may augment information provided through communications received from a preceding vehicle with its own sensor information for better tracking, for example cooperative ACC (CACC). When V2V communication is used, certain limitations on the message rate and vehicle density may present challenges for messaging in the platoon. Certain embodiments of the present disclosure may reduce or eliminate these challenges, as described in greater detail in this disclosure.

Figure 4:
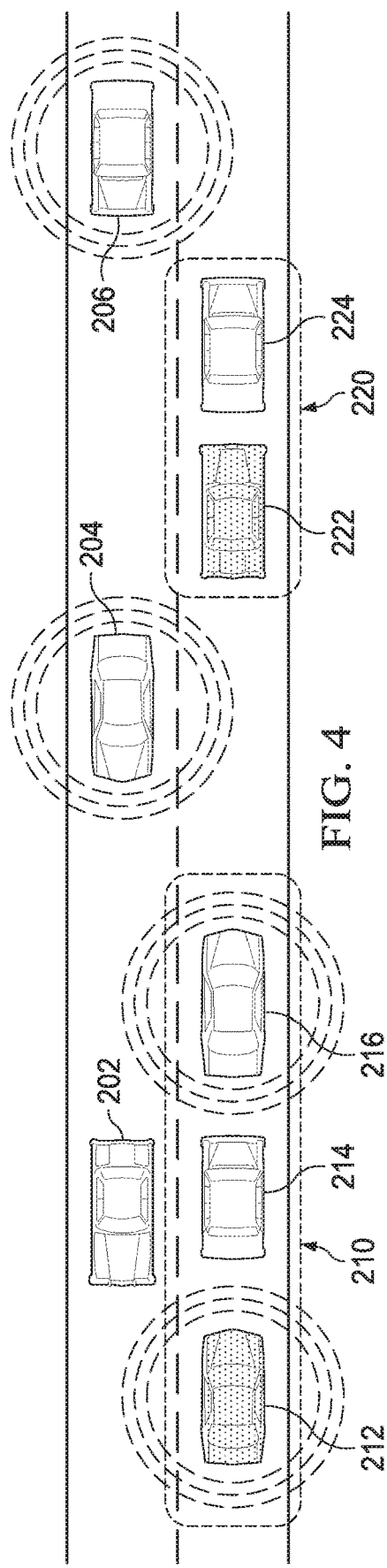
FIG. 4 illustrates examples of platooning, according to certain embodiments of the present disclosure.

FIG. 4 illustrates examples of platooning, according to certain embodiments of the present disclosure. Vehicles 212, 214, and 216 are in a platoon 210, where vehicle 212 is the platoon leader of platoon 210. Also, platoon 220 includes vehicle 222, which is the platoon leader, and vehicle 224, which is trailing vehicle 222. Vehicles 202, 204, and 206 do not belong to a platoon. Vehicles 212, 216, 204, and 206 are broadcasting.

In one example, vehicle 214 is unable to receive a transmission from vehicle 212 due to interference caused by simultaneous transmissions from vehicle 216 and from vehicle 204. Transmissions from vehicle 206 may not contribute much interference, because the distance between vehicle 206 and vehicle 214 significantly attenuates the signal transmitted from vehicle 206. Vehicle 216 also is unable to receive the transmission from vehicle 212, because it is currently transmitting.

Platoon coordination may improve the reliability of messaging in a group of vehicles. For example, when a vehicle is broadcasting, preventing other vehicles in the platoon from transmitting may improve the reliability of messaging in a platoon. In one example, preventing vehicles 214 and 216 from transmitting while vehicle 212 is transmitting improves the reliability of receiving the transmission from vehicle 212 in platoon 210 by a factor of two.

Figure 5:
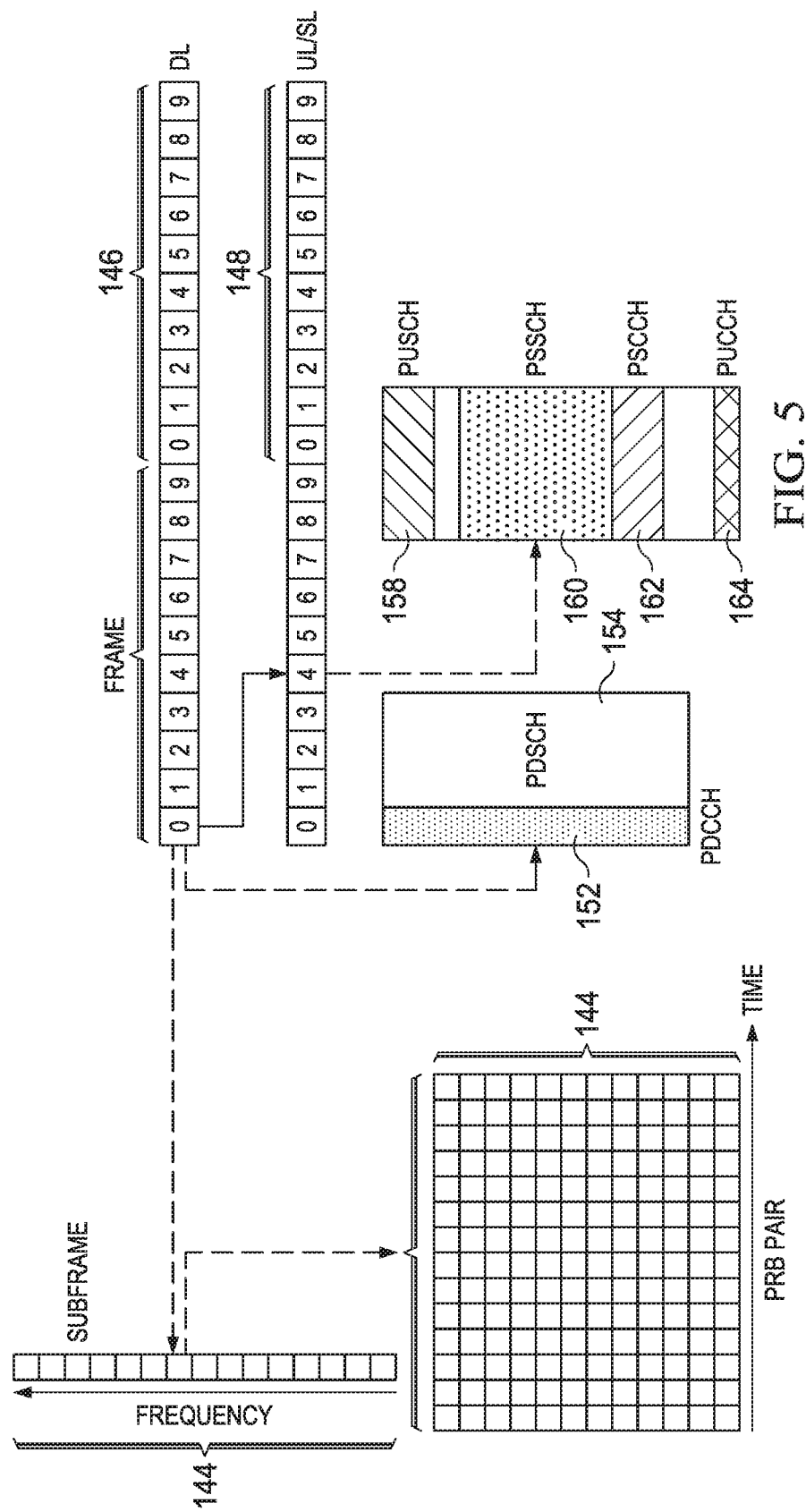
FIG. 5 illustrates an example long term evolution (LTE) frame structure, according to certain embodiments of the present disclosure.

FIG. 5 illustrates an example LTE frame structure, according to certain embodiments of the present disclosure. Understanding this frame structure may facilitate an understanding certain aspects of the present disclosure related to sidelink transmission. In wireless communication systems, such as LTE, a radio frame is a digital transmission unit for wirelessly transmitting information. In one example, a frame is 10 milliseconds (ms), and a 10 ms frame contains ten 1 ms sub-frames. In LTE, at least two types of frame structures are defined. The first, referred to as a Type 1 frame structure, is used for LTE frequency division duplexing (FDD) mode systems. The second, referred to as a Type 2 frame structure, is used for LTE time division duplexing (TDD) mode systems. In FDD, there is a downlink (DL) carrier and an uplink (UL) or sidelink (SL) carrier. In TDD, a frame contains multiple subframes.

Resources for the sidelink are a subset of the resources for the uplink. For example, DL frame 146 and UL/SL frame 148 are 10 ms frames containing ten 1 ms sub-frames. A base station, such as an eNB, can configure the number of uplink subframes for sidelink operations. The sidelink subframes may be used for both uplink and sidelink operations.

For a given carrier, a subframe includes a number of physical resource block (PRB) pairs, such as PRB pairs 144. FIG. 5 illustrates the same number of PRB pairs 144 for downlink, uplink, and sidelink, but there may be different numbers of PRB pairs in downlink, uplink, and sidelink. In LTE, fifteen PRB pairs correspond to 3 MHz bandwidth, and each PRB pair includes twelve subcarriers spaced 15 kHz apart. For a normal cyclic prefix, the PRB pair spans fourteen symbols in time. Hence, there are 12*14=168 resource elements (REs) in a PRB pair.

On the downlink, subframes may be partitioned into a control region, which is used to transmit the physical downlink control channel (PDCCH) 152, and a data region, which is used to transmit the physical downlink shared channel (PDSCH) 154, as well as an enhanced PDCCH (EPDCCH). The EPDCCH may provide any functionality of the PDCCH. The PDCCH or EPDCCH carries downlink control information (DCI).

On the uplink, some PRB pairs are configured for sidelink operation. PSCCH 162 provides scheduling information, using an SCI for a data payload transmitted in PSSCH 160. In some embodiments, the PSCCH and the corresponding PSSCH are transmitted in the same subframe. Additionally, the physical uplink shared channel (PUSCH) 158 carries data packets from a UE to a base station, such as an eNB. Also, the physical uplink control channel (PUCCH) 164 carries uplink control information (UCI).

In LTE, transmission on the sidelink at the physical layer is via broadcast, which may limit transmission reliability. The use of unicast or groupcast communication at the physical layer, as made possible by certain embodiments of the present disclosure, may improve sidelink communications. Additionally, the use of hybrid automatic repeat request (HARQ) in the sidelink may improve the reliability in the sidelink by providing a mechanism for a transmitting device to receive feedback regarding whether a transmission reached an intended target or targets and, if not, take corrective action (e.g., retransmission). An embodiment provides HARQ support for unicast or groupcast transmission in the sidelink.

In NR, also referred to as fifth generation (5G), orthogonal frequency division multiplexing (OFDM) is used on the downlink. The uplink supports single-carrier frequency-division multiple access (SC-FDMA) and cyclic prefix (CP)-OFDM. SC-FDMA may lead to lower peak-to-average power ratio (PAPR) while restricting the subcarriers to be contiguous. CP-OFDM relaxes the contiguous sub-carrier requirement. In NR, for downlink transmissions, under certain slot configurations, an uplink resource for acknowledgement shortly follows the transmission of the downlink shared channel. A similar slot structure may be used for sidelink.

In LTE, for a unicast transmission of the PDSCH from a base station (e.g., an eNB) to a UE, the PDSCH is acknowledged by the UE at a specific time later on uplink resources. For example, in FDD, on the downlink, a base station (e.g., an eNB) transmits a DCI on a PDCCH located on a control channel element (CCE) in subframe n. The DCI indicates the resources for the corresponding PDSCH transmission. The PDSCH transmission may also be on subframe n. On subframe n+4, the UE transmits an ACK/NACK for the PDSCH transmission. The ACK/NACK is conveyed in a UCI message. The UCI may be transmitted on the PUCCH or by puncturing resources for a PUSCH. When a PUCCH is used, the UE sends the UCI on the PUCCH on resources that is a function of the lowest CCE index of the PDCCH associated with the PDSCH and the resources configured by the base station (e.g., the eNB), for example the lowest and highest numbered PRB on the uplink. In TDD, the ACK/NACK is transmitted at time n+k, where k≥4 is determined according to the uplink-downlink configuration and the subframe number on which the PDSCH was received.

For uplink shared channel transmissions, a UE receives a PDCCH in subframe n. In FDD, a UE transmits the PUSCH on subframe $n+_4$. Then, the base station (e.g., the eNB) can send an ACK/NACK in the physical HARQ indicator channel (PHICH) on subframe n+8. The PHICH can convey ACK/NACKs for several received PUSCHs.

Figure 6:
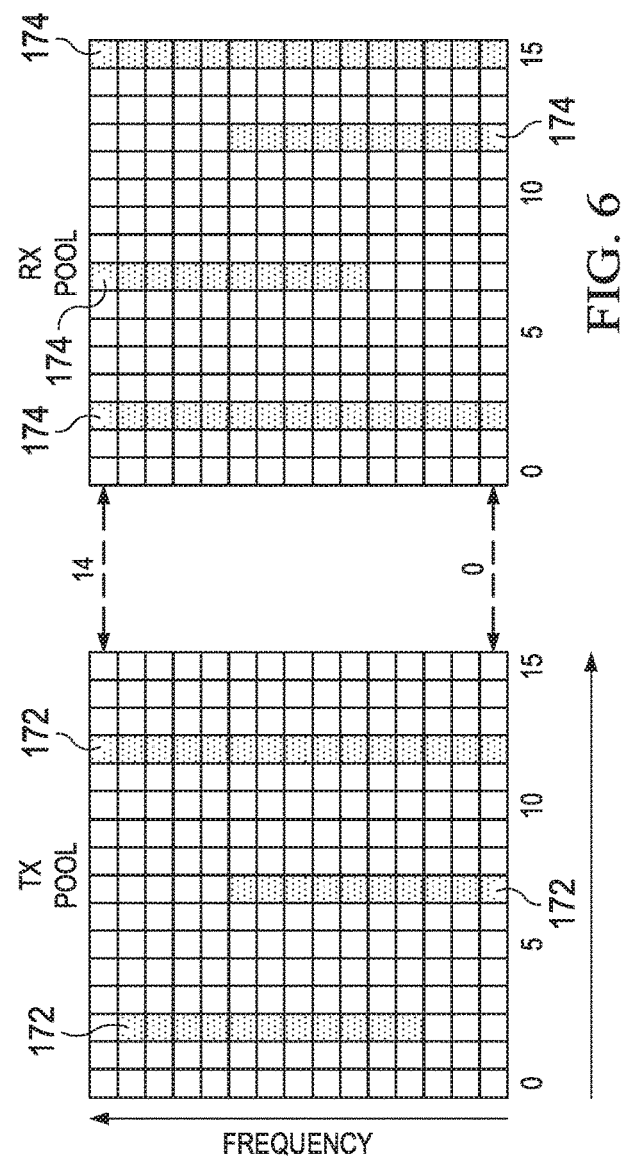
FIG. 6 illustrates example transmission pools and reception pools for sidelink communications, according to certain embodiments of the present disclosure.

FIG. 6 illustrates example transmission pools and reception pools for sidelink communications, according to certain embodiments of the present disclosure. In particular, FIG. 6 illustrates example transmission pool (Tx) pool 172 for sidelink communication and reception pool (RX) pool 174 for sidelink communication.

A base station (e.g., an eNB) can indicate which UL subframes and which PRB pairs on the particular UL subframes may be configured for transmission opportunities on the sidelink, Tx pool 172. The base station (e.g., the eNB) can indicate which UL subframes and which PRB pairs on the particular subframes can be configured for monitoring transmission (reception) on the sidelink, Rx pool 174. In the illustrated example, Tx pool 172 is configured for PRB pairs 3-13 on subframe 2, PRB pairs 0-9 on subframe 7, and PRB pairs 0-14 on subframe 12, which is subframe 2 of the next frame. Additionally, Rx pool 174 is configured for PRB pairs 0-14 on subframe 2, PRB pairs 5-14 on subframe 7, PRB pairs 0-9 on subframe 12, and PRB pairs 0-14 on subframe 14 (subframe 4 of the next frame). Tx pool 172, as illustrated, may be different than, or disjoint from, Rx pool 174. In some embodiments, the Tx pool overlaps with the Rx pool. In other embodiments, the Tx pool may be the same as the Rx pool. In some embodiments, the Tx pool and the Rx pool are not contiguous in frequency.

In a network mode (sidelink transmission mode 1 for D2D), a two-step process may allow a UE (e.g., a source mobile device) to transmit data on the sidelink, according to certain embodiments. First, the base station (e.g., an eNB) transmits a DCI on a PDCCH for a specific UE (e.g., the source mobile device), where the UE (e.g., the source mobile device) is assigned a 16-bit radio network temporary identifier (RNTI). As an example, according to certain standards, DCI format 5 is used to schedule sidelink communications for D2D. See, e.g., "3GPP TS 36.212 V12.4.0, Sections 5.4.3 and 5.3.3.1 (2015 March)," "3rd Generation Partnership Project, Technical Specification Group Radio Access Network, Evolved Universal Terrestrial Radio Access (E-UTRA), Multiplexing and channel coding (Release 12);" and "3GPP TS 36.213 V12.11.0, Sections 14.1 and 14.2 (2016 September)," "3rd Generation Partnership Project, Technical Specification Group Radio Access Network, Evolved Universal Terrestrial Radio Access (E-UTRA), Physical layer procedures (Release 12)." In response to receiving the PDCCH, the source mobile device transmits an SCI or scheduling assignment (SA) using the PSCCH. Fields conveyed in an SCI may include any suitable combination of resource locations for shared channels (PSSCH), modulation/coding scheme (MCS), priority, transmission/retransmission number, and destination identifier (ID).

In a later subframe, the source mobile device transmits the data using the PSSCH on the sidelink. There is a timing relationship between the subframe when a source mobile device receives a PDCCH containing sidelink directives, such as a DCI format 5, and the transmission of the PSCCH. For FDD, on the sidelink, the PSCCH is transmitted at least four subframes after receiving the PDCCH. Before a source mobile device transmits data on the PSSCH, the source mobile device transmits an SCI on the PSCCH, which contains scheduling information for the PSSCH. In some embodiments, several fields of DCI format 5 are copied by the source mobile device into SCI format 0. In certain embodiments, the base station (e.g., the eNB) has no knowledge of the data payload, or contents, that a source mobile device transmits on the PSCCH.

For the destination mobile device, the sidelink carrier is monitored for a PSCCH at a pre-determined time and on a set of frequency resources (e.g., pools). Once the PSCCH is detected, the destination mobile device processes the SCI to locate the resources for the corresponding PSSCH. Then, the destination mobile device attempts to obtain the data packet from the received PSSCH.

This procedure may have one or more drawbacks. For example, the data packet is broadcast, as opposed to being unicast to a particular destination mobile device or groupcast/multicast to a group of destination mobile devices, where unicast is a special case of groupcast. Accordingly, due to the data packet being broadcast, the source mobile device does not receive an ACK/NACK indicating whether the destination mobile device correctly received the data packet, as destination mobile devices forgo sending ACKs or NACKs in response to broadcast messages.

As another example, because a mobile device may either transmit or receive on the sidelink carrier for a time period (e.g., a number of subframes), the mobile device is not transmitting and receiving at the same time. Thus, the destination mobile device may be transmitting while the source mobile device is transmitting, which may cause the destination mobile device to not receive the transmission from the source mobile device. Likewise, the source mobile device may be unable to receive the transmission from the destination mobile device.

As another example, the reliability of receiving a data packet may decrease when the messaging rate increases. With a higher mobile device density (e.g., a higher number of UEs within an area), the amount of interference increases due to more mobile device transmissions at the same time. Finding an opportunity to transmit when many mobile devices are attempting to transmit may be problematic, due to blocking based on sensing measurements of the channel. Coordination of the timing of mobile device transmissions may be used to manage interference.

In D2D communication mode, a UE receives a DCI in subframe n. The UE then transmits an SCI in subframe n+l', where l' is the first available subframe configured for PSCCH, and l'≥4 after subframe n. There are two transmissions of the PSCCH. Next, the UE transmits the PSSCH in subframe n+l'+l", where l" is the first available subframe configured for PSCCH after subframe n+l' and l"≥4. The retransmission of the PSSCH occurs in the subframe indicated by the base station (e.g., the eNB).

In V2V, the network mode (sidelink transmission mode 3 or scheduled resource allocation), according to certain standards, DCI format 5A is used to schedule sidelink communications for V2X. See, e.g., "3GPP TS 36.212 V14.4.0, Sections 5.4.3 and 5.3.3.1 (2017 September)," "3rd Generation Partnership Project, Technical Specification Group Radio Access Network, Evolved Universal Terrestrial Radio Access (E-UTRA), Multiplexing and channel coding (Release 14);" and "3GPP TS 36.213 V14.7.0, Sections 14.1 and 14.2 (2018 June)," "3rd Generation Partnership Project, Technical Specification Group Radio Access Network, Evolved Universal Terrestrial Radio Access (E-UTRA), Physical layer procedures (Release 14)." When a source vehicle transmits payload data on the PSSCH, it transmits an SCI (e.g., SCI format 1) on the PSCCH in the same subframe. In some examples, several fields of DCI format 5A are copied by the source vehicle into SCI format 1.

In sidelink transmission mode 3, initially a UE receives a DCI in subframe n. Then, the UE transmits an SCI in subframe n+l', where l' is the first available subframe configured for PSCCH, and l'≥4 after subframe n. Also, the UE transmits the PSCCH in subframe n+l'+l". When l"=0, the PSCCH is transmitted in the same subframe as the SCI. When signaled, the PSSCH is retransmitted in a subframe indicated by the information contained in the SCI.

With semi-persistent scheduling (SPS), the network may define a periodic process for the transmission of PSCCH/PSSCH using high level signaling, such as an SPS-ConfigSL information element, and DCI format 5A.

In certain embodiments, it is the responsibility of the network to ensure that the PSCCH/PSSCH transmitted by the source vehicle is in a valid pool so that other vehicles can receive the PSCCH/PSSCH.

In autonomous mode (sidelink transmission mode 4 or V2V), the source vehicle first determines when it can transmit in a Tx pool by monitoring resources, for example measuring signal levels (sensing), within a Tx pool, and randomly selecting resources in the Tx pool. The source vehicle examines the priority levels for a message (to be transmitted by the source vehicle) relative to the priority levels of messages on the resources and examines the occupancy times. After identifying when and on what resources the source vehicle can transmit, the source vehicle transmits the data packet on the PSSCH and generates and transmits a corresponding SCI format for the PSCCH.

Certain embodiments of the present disclosure extend sidelink procedures to support unicast and/or groupcast. For example, to support unicast and groupcast in the sidelink, control signaling is modified. Certain embodiments of the present disclosure support feedback the destination mobile device providing feedback and define associated feedback procedures. Additionally, a HARQ signaling timeline may be incorporated.

It may be desirable to establish groups of UEs. Groups of UEs may be established in a variety of manners. A base station (e.g., an eNB) or other network component may create the groups. In other examples, groups are a priori configured or reconfigured, such as a group of public safety mobile devices or the electronic devices within a house. The groups may be created based on physical proximity of the mobile devices. For example, mobile devices within a given distance of a particular mobile device may be grouped together for a set duration.

LTE includes several feedback mechanisms for acknowledgements for packets sent on the downlink (e.g., PDSCH) and for packets sent on the uplink (e.g., PUSCH). For PDSCH, a UE may send a UCI on the PUCCH. The PUCCH has several forms of multiplexing: time (e.g., slots), frequency (e.g., PRB), and code (e.g., to separate UEs transmitting on the same time/frequency resource). A UE can also multiplex, or piggyback, the UCI on the PUSCH. The UE may send the UCI on PRB pairs without a PUSCH. For acknowledgements for the PUSCH, the base station (e.g., the eNB) sends an ACK/NACK on the PHICH. For one PHICH group, up to eight ACK/NACKs may be supported. Using HARQ, a source UE transmits packets and expects to receive a response, for example an ACK/NACK for the packet.

Figure 7:
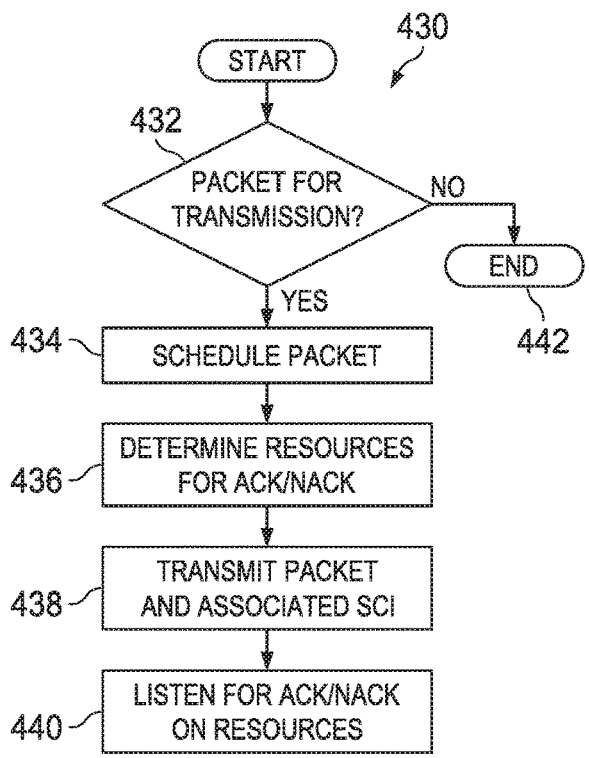
FIG. 7 illustrates a flowchart of an example method of transmitting packets on the sidelink, performed by a source mobile device, and in which the source mobile device expects an acknowledgement, according to certain embodiments of the present disclosure.

FIG. 7 illustrates a flowchart of an example method 430 of transmitting packets on the sidelink, performed by a source mobile device, and in which the source mobile device expects an acknowledgement, according to certain embodiments of the present disclosure. In this example, the application layer may indicate to the physical layer to use a group for a data packet.

In block 432, the source mobile device determines whether a data packet for transmission exists. The data packet may be obtained by the physical layer from a higher layer. When the source mobile device determines that there is no data packet for transmission, the procedure ends in block 442. On the other hand, when the source mobile device determines that there is a data packet for transmission, the procedure proceeds to block 434.

In block 434, the source mobile device performs scheduling for the data packet. The data packet may be scheduled, for example, by sensing the transmission medium with a procedure from a suitable version of the LTE standard. See, e.g., "3GPP TS36.213 V14.7.0, Sections 14.1 and 14.2 (2018 June)," "3rd Generation Partnership Project, Technical Specification Group Radio Access Network, Evolved Universal Terrestrial Radio Access (E-UTRA), Physical layer procedures (Release 14);" and "3GPP TS 36.321 V14.4.0, Section 5.14 (2017 September)," "3rd Generation Partnership Project, Technical Specification Group Radio Access Network, Evolved Universal Terrestrial Radio Access (E-UTRA), Medium Access Control (MAC) protocol specification (Release 14)." In another example, the network (e.g., via a base station, such as an eNB) provides, for example using a DCI message or an SPS process, the resources for transmission.

The source mobile device also determines scheduling information associated with the data packet and the control resources for transmitting the scheduling information. The control resources may be determined from a first set of resources. In certain embodiments, the control resources comprise a PSCCH. The scheduling information may be or include the SCI associated with the data packet. For example, the scheduling information (e.g., the SCI) may indicate the destination mobile device for which the data packet is destined. As another example, the scheduling information (e.g., the SCI) may contain an indication that the data packet is to be acknowledged (e.g., with an ACK or a NACK), using, for example, a bit indicator or a group ID. As another example, the scheduling information (e.g., the SCI) may include the time/frequency resource allocation for the ACK/NACK. As another example, the scheduling information may include transmission information for transmitting the data packet from the source mobile device. As a particular example, the transmission information may indicate a particular PSSCH to be used from transmitting the data packet from the source mobile device. Although these particular parameters have been described, the present disclosure contemplates the scheduling information including any suitable transmission parameters, according to particular implementations. In some scenarios, as described in greater detail below, the transmission information for transmitting the data packet is retransmission information for retransmitting the data packet, and transmitting, by the first mobile device to the second mobile device, the data packet on the set of resources indicated by the transmission information includes retransmitting the data packet on the set of resources indicated by the retransmission information.

In one example, code division multiple access (CDMA) is used, and each destination mobile device within a group has a unique ID within the group (e.g., a group member ID). A CDMA code may be selected based on this unique group member ID. As one example, the group member ID may be four bits, and the selected CDMA code is a Hadamard sequence (or another suitable error-correction code) corresponding to the index ID. The message containing the ACK/NACK of a given destination mobile device may be transmitted to the source mobile device on the time/frequency resources for the packet acknowledgement, and the message may be spread with the CDMA code. In certain embodiments, the destination mobile device transmits the ACK or the NACK using open-loop power control, for example based on the received power level of the scheduling information (e.g., the SCI) or the data packet, which may reduce or eliminate near-far issues. In certain embodiments, the destination mobile device transmits the ACK or the NACK randomly or pseudo-randomly, and a region for the ACK or the NACK, as opposed to a specific time/frequency resource, is indicated by the source mobile device in the scheduling information transmitted to the destination mobile device.

Also, in block 436, the source mobile device determines, from a second set of resources, the ACK/NACK resources associated with the data packet. In other words, the source mobile device determines the ACK/NACK resources to be used by the destination mobile device to transmit the ACK or the NACK. In certain embodiments, block 436 may be performed together with block 434. In certain embodiments, the first mobile device receives from an eNB a DCI indicating the second set of resources.

The source mobile device may determine the ACK/NACK resources in a variety of ways. For example, the ACK/NACK resources may be selected from a pre-defined ACK/NACK resource pool, which may be the second set of resources. As another example, the time/frequency resources for the ACK/NACK may be implicitly derived from the location of the scheduling information (e.g., the SCI) or the location from which the data packet is transmitted. As a particular example, the scheduling information (e.g., the SCI) is transmitted in the resource within the resource pool at least a pre-defined time, for example 4 ms, following the transmission of scheduling information (e.g., the SCI). As another particular example, the SCI resources may be logically indexed, and the ACK/NACK resources may be logically indexed. A one-to-one mapping may be used between the SCI resources and the ACK/NACK resources. For example, when the SCI resource #k is used, ACK/NACK resource #k is used. The resource number may be the sub-channel number. In another example, the resource number is related to the PRB index in the Tx pool. In one embodiment, the ACK/NACK resources are located in the ACK/NACK resource pool four subframes after the SCI transmission on the same frequency resources as the SCI.

In block 438, the source mobile device transmits the data packet and the associated scheduling information to the destination mobile device(s). The source mobile device communicates the data packet and associated scheduling information (e.g., SCI) using the sidelink interface. For example, the source mobile device may transmit to the destination mobile device the scheduling information on the control resources for transmitting the scheduling information and the data packet on a set of resources indicated by the transmission information of the scheduling information. As a particular example, the scheduling information may specify in the transmission information a particular PSSCH, and the source mobile device may transmit the data packet using the particular PSSCH. The scheduling information may be transmitted to the destination mobile device using the particular control resources determined at step 434, such as a particular PSCCH.

In certain embodiments, the first mobile device transmits the scheduling information from the first mobile device to one or more destination mobile devices by broadcasting a message that includes the scheduling information on the determined control resources. For example, the first mobile device may transmit to the second mobile device the scheduling information on the control channel by broadcasting, by the first mobile device, the scheduling information associated with the data packet on the PSCCH, the scheduling information being broadcast as sidelink control information (SCI). In certain embodiments, the first mobile device transmits the data packet from the first mobile device to one more destination mobile devices by broadcasting a message that includes the data packet. In certain embodiments, the data packet and the SCI may be broadcast together as part of a joint message.

In block 440, the source mobile device listens for an ACK/NACK transmitted by the destination mobile device on the ACK/NACK resources (e.g., the ACK/NACK resources determined in block 436). When random transmission is used, in certain embodiments, the source mobile device attempts to detect the ACK/NACK on all resources within the region. The destination mobile devices send the ACK/NACK pseudo-randomly or randomly on resources within the region. Collisions may occur between ACK/NACK transmissions from multiple destination mobile devices transmitted on the same resource.

Figure 8:
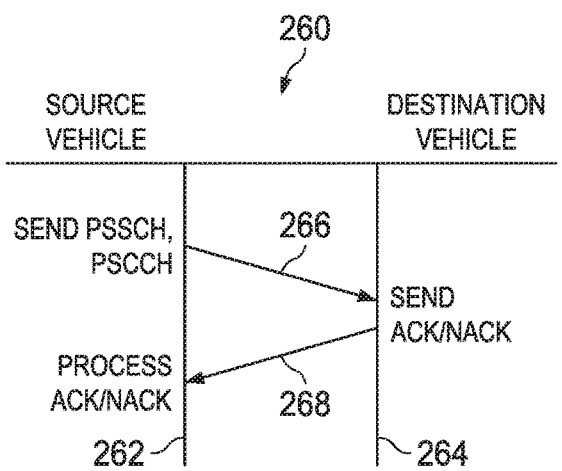
FIG. 8 illustrates an example message diagram for communication between mobile devices, according to certain embodiments of the present disclosure.

FIG. 8 illustrates an example message diagram 260 for communication between mobile devices, according to certain embodiments of the present disclosure. In the illustrated example, the mobile devices are referred to as vehicles (i.e., source vehicle 262 and destination vehicle 264); however, the present disclosure contemplates the mobile devices being any suitable type of mobile devices.

A source vehicle 262 determines the transmission status of a transport block (TB), for example a new transmission or a retransmission. Throughout this description, a transmission block may also be referred to as a data packet. For an initial transmission, fields in the scheduling information (e.g., the SCI) are prepared, and a counter is reset. For retransmissions, fields in the scheduling information (e.g., the SCI) are prepared, and the counter is updated. The counter is described in greater detail below with reference to FIG. 9. Source vehicle 262 encodes the scheduling information (e.g., the SCI) and transmits the encoded scheduling information (e.g., the encoded SCI) on determined control resources (e.g., on a PSCCH) in a message 266 to a destination vehicle 264. The TB also may be encoded, modulated, and placed on sidelink resources in accordance with the fields of the scheduling information (e.g., the SCI). The TB is transmitted by source vehicle 262 to destination vehicle 264 on the resources indicated by the transmission information of the scheduling information. For example, the TB may be transmitted by source vehicle 262 on a PSSCH in message 266.

In response to message 266, destination vehicle 264 sends an ACK or a NACK to source vehicle 262 on a message 268 in accordance with parameters (e.g., the scheduling information) included in message 266. After receiving the ACK/NACK from destination vehicle 264 on the ACK/NACK resources indicated by the scheduling information, source vehicle 262 processes the ACK/NACK.

Figure 9:
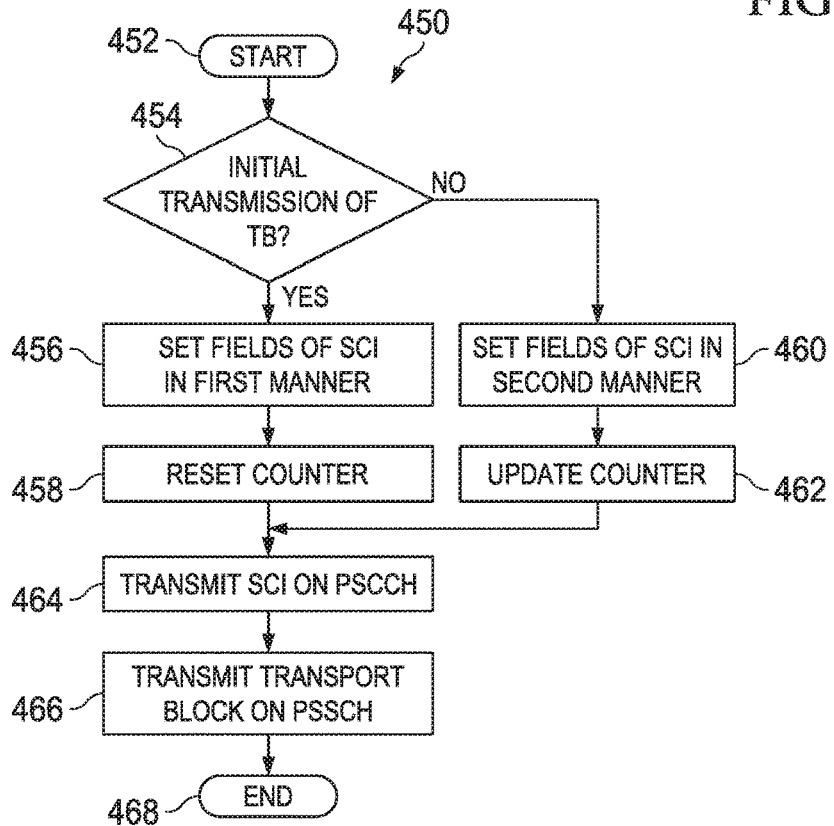
FIG. 9 illustrates a flowchart of an example method for an acknowledgement (ACK)/negative acknowledgement (NACK) procedure performed by a source mobile device, according to certain embodiments of the present disclosure.

FIG. 9 illustrates a flowchart of an example method 450 for an ACK/NACK procedure performed by a source mobile device, according to certain embodiments of the present disclosure. As one example, method 450 illustrates details of blocks 434 and 438 of FIG. 7. The source mobile device may be a vehicle performing V2V communications or another UE performing D2D communications, for example. In block 452, the source mobile device starts the procedure.

In block 454, the source mobile device determines whether a transmission is an initial transmission of a TB or a retransmission. When the transmission is an initial transmission, the source mobile device proceeds to block 456 to set fields of scheduling information (e.g., of SCI) in a first manner. On the other hand, when the transmission is a retransmission, the source mobile device proceeds to block 460 to set fields of scheduling information (e.g., of SCI) in a second manner.

In block 456, for an initial transmission, the source mobile device sets fields of scheduling information (e.g., of SCI) in a first manner. For example, the value of the new data indicator (NDI) field of the SCI may be toggled. As a particular example, when the NDI currently has a value of 0, it is changed to a value of 1, and when the NDI currently has a value of 1, it is changed to a value of 0. Other fields in the SCI may be set. For example, the MCS and the resource allocation fields may be set by assigning values to those fields. Also, a group ID, such as in SCI format 0, associated with the group may be inserted into the SCI. In one example, the group ID is a small-size field, such as 8 bits or 12 bits. Additionally, the SCI may include an indicator for a Hadamard sequence or other type of error-correction code. The source mobile device also may set the redundancy version (RV) field to 0. In block 458, the source mobile device resets a counter for the number of transmissions of this TB. Although preparing particular fields of scheduling information (e.g., of SCI) are described, the present disclosure contemplates setting any appropriate fields of scheduling information (e.g., of SCI) in any suitable manner.

In block 460, for retransmission, the source mobile device sets fields of scheduling information (e.g., of SCI) in a second manner. For example, the source mobile device may retain the value of the NDI bit (e.g., the value of the NDI bit remains unchanged). As another example, the source mobile device may update the RV field. One example way of updating the RV field is according to a cycling of values. As an example of this cycling of values, when the value of the RV field initially is 0, the value of the RV field transitions to 2; when the value of the RV field initially is 2, the value of the RV field transitions to 3; when the value of the RV field initially is 3, the value of the RV field transitions to 1; and when the value of the RV field initially is 1, the value of the RV field transitions to 0. The source mobile device also may set other fields in the SCI. For example, the source mobile device may set the MCS and the resource allocation fields. Also, a group ID, such as an SCI format 0, associated with the group may be inserted into the SCI. The group ID may be a small size field for example 8 bits or 12 bits. Additionally, the SCI may include an indicator to a Hadamard sequence or other type of error-correction code. In block 462, the source mobile device updates the counter for the number of transmissions of this TB. In one example, the counter is incremented, as source mobile device determined in block 454 that the transmission is a retransmission. Again, although preparing particular fields of scheduling information (e.g., of SCI) are described, the present disclosure contemplates setting any appropriate fields of scheduling information (e.g., of SCI) in any suitable manner.

In block 464, the source mobile device transmits the scheduling information (e.g., SCI) to a destination mobile device on the control resources (e.g., on the PSCCH). For example, the source mobile device encodes the SCI and transmits it to the destination mobile device on the PSCCH.

In block 466, the source mobile device transmits the TB on the PSSCH to the destination mobile device. For example, the source mobile device encodes, modulates, and places the TB on sidelink resources in accordance with the fields of the SCI. The PSSCH may be indicated in the transmission information of the scheduling information that is transmitted to the destination mobile device. In block 468, the method ends.

Figure 10:
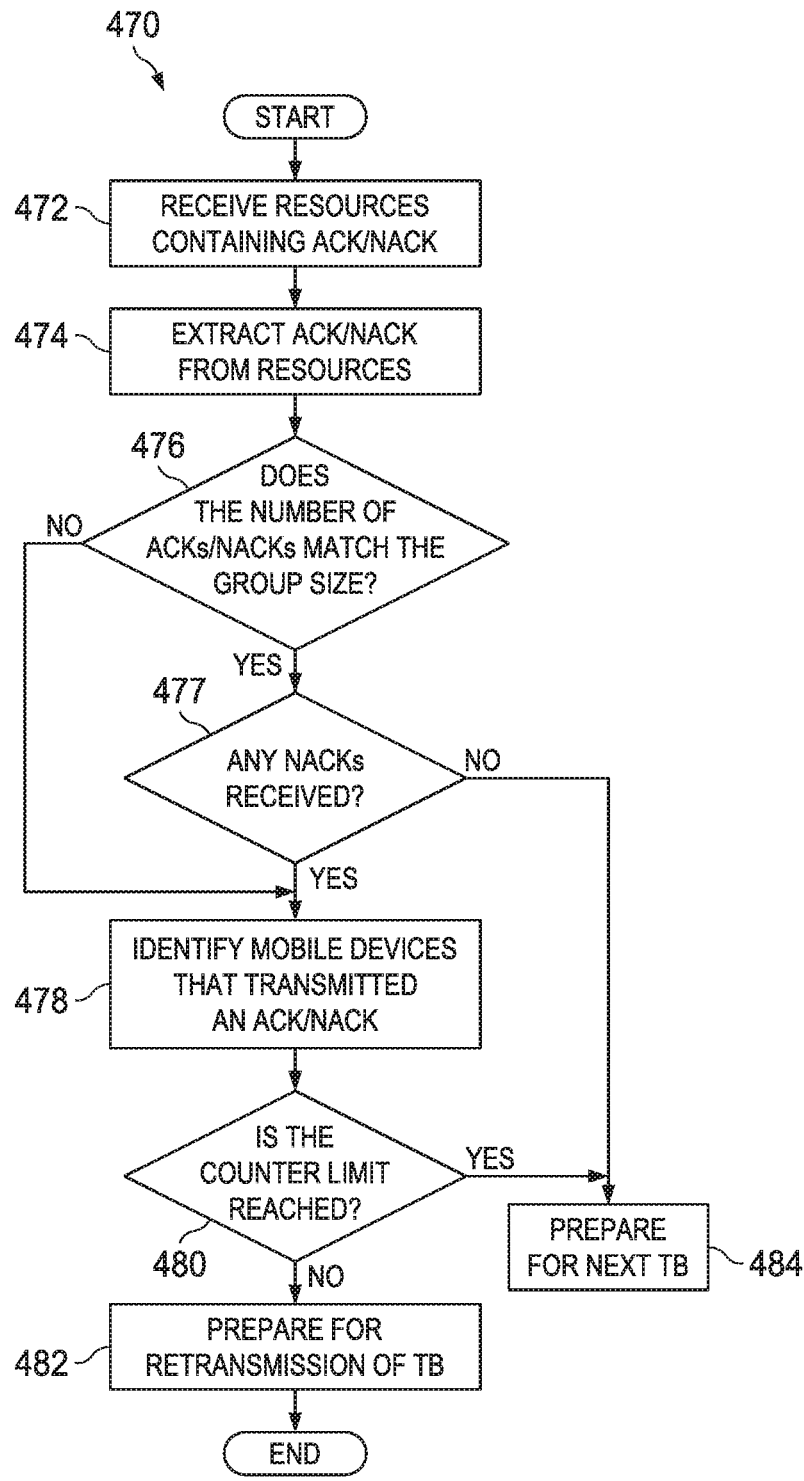
FIG. 10 illustrates a flowchart for an example method for monitoring ACKs/NACKs, performed by a source mobile device, according to certain embodiments of the present disclosure.

FIG. 10 illustrates a flowchart for an example method 470 for monitoring ACKs/NACKs, performed by a source mobile device, according to certain embodiments of the present disclosure. As one example, method 470 illustrates additional details of block 440 in FIG. 7. The source mobile device may be a vehicle performing V2V communications or a UE performing D2D communications.

In block 472, the source mobile device receives, from a destination mobile device, ACK/NACK resources containing an ACK or a NACK. The ACK/NACK may be received on ACK/NACK resources previously indicated by the scheduling information transmitted by the source mobile device on the control resources (e.g., PSCCH), and that the destination mobile device is in part responding to with the ACK/NACK (i.e., in response to which the destination mobile device transmitted the AKC/NACK). The communication from the destination mobile device to the source mobile device of the ACK/NACK on the ACK/NACK resources may be a communication that is directed to the source mobile device (e.g., rather than a broadcast message). An ACK may indicate that the destination mobile device correctly receive the data packet transmitted by the source mobile device on the transmission resources (e.g., the PSSCH) indicated by the scheduling information. An NACK may indicate that the destination mobile device at least partially did not correctly receive the data packet transmitted by the source mobile device on the transmission resources (e.g., the PSSCH) indicated by the scheduling information. In block 474, the source mobile device extracts the ACK/NACK from the resources received in block 472.

The source mobile device may count the number of ACKs/NACKs received in response to the transmission of a data packet and, based at least in part on the number of ACKs/NACKs received and a number of mobile devices in the group of mobile devices, whether to retransmit the data packet. For example, in block 476, the source mobile device determines whether the number of ACKs/NACKs matches a group size of a group. The group includes the destination mobile device for which the transmission of the data packet was destined. If the source mobile device determines that the number of ACKs/NACKs matches the group size, then the source mobile device proceeds to block 477 to determine whether any of the received ACKs/NACKs are NACKs. Alternatively, at block 477, the source mobile device could determine whether all of the received ACKs/NACKs are ACKs. If source mobile device determines at block 477 that none of the received ACKs/NACKs is a NACK (or, in the alternative determination, that all of the received ACKs/NACKs are ACKs), then the source mobile device proceeds to block 484. On the other hand, if source mobile device determines at block 477 that at least one of the received ACKs/NACKs is a NACK (or, in the alternative determination, that not all of the received ACKs/NACKs are ACKs), then the source mobile device proceeds to block 478. Returning to block 476, if the source mobile device determines that the number of ACKs/NACKs does not match the group size, then the source mobile device also proceeds to block 478.

In block 478, the source mobile device identifies the mobile devices that transmitted ACK/NACKs. In block 480, the source mobile device determines whether a counter limit is reached. This counter may be used by the source mobile device to prevent stalling when ACKs/NACKs are not properly received. When the counter limit is reached, the source mobile device proceeds to block 484. On the other hand, when the counter limit is not reached, the source mobile device proceeds to block 482.

In block 482, the source mobile device prepares for retransmission of the TB. The source mobile device may then perform the method illustrated in FIG. 9.

In block 484, the source mobile device prepares the next TB for transmission. The source mobile device may then perform the method illustrated in FIG. 9.

In certain embodiments, the group ID is partitioned into two sets, where a value of zero indicates a broadcast, and a nonzero value is associated with a particular group. For example, a 4-bit group member ID may be partitioned into two sets, where a value of "0000" indicates that the transmission is broadcast, and a nonzero value, such as "0001," is the group member ID associated with the transmitting mobile device. In an example, when the group member ID indicates that the transmission is a broadcast, no acknowledgement is expected from the destination mobile device. Also, when the group ID indicates that the transmission is a broadcast, the group member ID may be ignored. When the group ID field indicates a particular group ID, the destination mobile devices are expected to acknowledge the transmission by transmitting an ACK or a NACK. In another example, a bit in the scheduling information (e.g., a bit of the SCI) indicates whether a PSSCH is broadcast or groupcast. In certain embodiments, when the PSSCH is broadcast, an acknowledgment is not expected, but when the PSSCH is groupcast, an acknowledgement is expected.

It may be desirable for a destination mobile device to send HARQ feedback to the source mobile device, and for the source mobile device to receive ACK/NACK feedback within the framework of LTE and NR. In a centralized system, such as a cellular system, the central controller (e.g., eNB in LTE or gNB in NR) allocates resources for UEs to send ACK/NACK. In a distributed system, there might not be a centralized controller. Thus, in a distributed system, it is desirable to have a mechanism by which a source mobile device does not transmit when the source mobile device is expecting an ACK/NACK but is not receiving one.

In groupcast, multiple mobile devices transmitting or receiving at the same time may lead to collisions and other issues, as described in greater detail below.

Figure 11A:
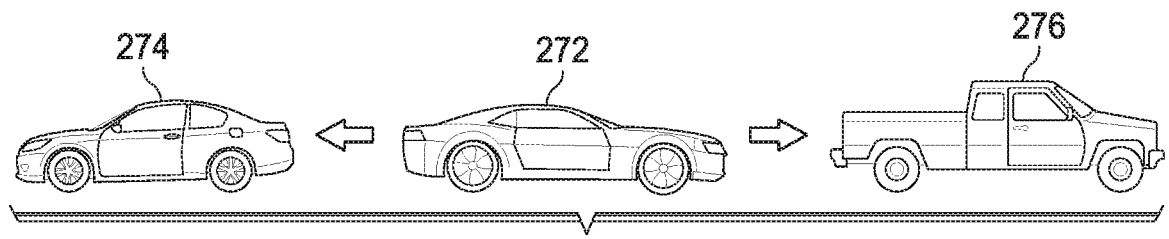
FIGS. 11A-B illustrate an example vehicle groupcast scenario, according to certain embodiments of the present disclosure.
Figure 11B:
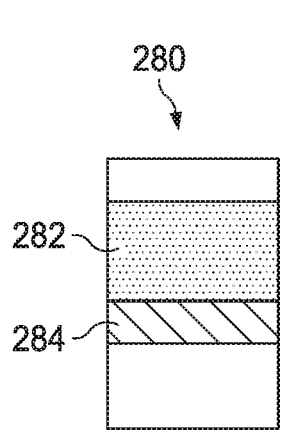

FIGS. 11A-B illustrate an example vehicle groupcast scenario, according to certain embodiments of the present disclosure. In the illustrated example, the groupcast transmission leads to issues. In FIG. 11a, vehicle 272 performs a groupcast to vehicle 274 and to vehicle 276. FIG. 11b illustrates a transmitted subframe 280, which contains one SCI and one shared channel, from the perspective of vehicle 272. Subframe 280 contains a PSSCH 282 and a PSCCH 284.

There may be collisions when vehicle 274 and vehicle 276 transmit feedback. When vehicle 274 and vehicle 276 transmit at the same time but on different resources, the received power from the feedback may be different in the two received signals. The feedback from vehicle 274 and from vehicle 276 may collide at vehicle 272 when the feedback is transmitted at the same time on the same resources. When there is a collision, there may also be a difference in the received power. Another possible issue is that, when vehicle 274 receives a first message from vehicle 272 in subframe n, and vehicle 276 receives a second message from vehicle 272 in subframe n+k, the feedback from vehicle 274 is delayed, because of TDD rules, and is on the same subframe as the feedback from vehicle 276.

Figure 12B:
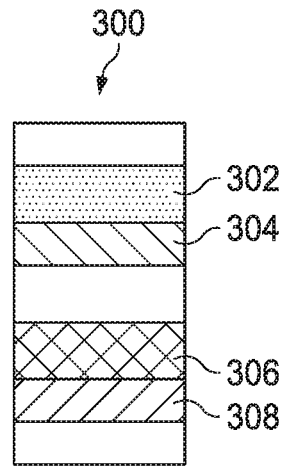
FIGS. 12A-B illustrate example vehicle coordination with single-carrier frequency-division multiple access (SC-FDMA), according to certain embodiments of the present disclosure.
Figure 12A:
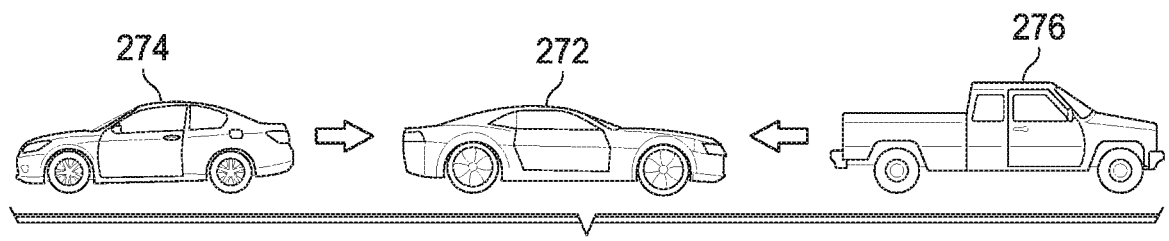

FIGS. 12A-B illustrate example vehicle coordination with SC-FDMA, according to certain embodiments of the present disclosure. In particular, FIGS. 12A-B illustrate a potential coordination problem with SC-FDMA. FIG. 12a illustrates a scenario in which vehicle 272 receives a message from vehicle 274, and vehicle 272 receives a different message from vehicle 276. FIG. 12b illustrates subframe 300 from the perspective of vehicle 272. Subframe 300 contains two shared channels, PSSCH 302 from vehicle 274 and PSSCH 306 from vehicle 276. Also, subframe 300 contains two SCIs, PSCCH 304 from vehicle 274, and PSCCH 308 from vehicle 276. It may be problematic for vehicle 272 to transmit feedback on two different resources in the same subframe. In some scenarios, vehicle 272 only supports transmission on one resource in a subframe. Also, carrier aggregation rules may lead to issues.

An ACK/NACK is typically transmitted on a channel. In LTE, the ACK/NACK for downlink data sent on a PDSCH is sent on particular PUCCH resources or is punctured on the PUSCH. A PHICH is transmitted by the base station (e.g., the eNB) to convey the ACK/NACK of a received PUSCH. With sidelink transmissions, the ACK/NACK may be sent on the PSSCH, possibly with a different payload size or on a new channel. The new channel, for example the physical sidelink HARQ indicator channel (PSHICH), may have resources for reliable ACK/NACK reception.

In an embodiment, a resource pool for ACK/NACK transmission is pre-defined. The resource pool is linked to the data transmission, so the source and destination mobile devices (e.g., UEs) know the location of the resource pool for a given transmission. In an embodiment, as described above, resources for a particular ACK/NACK may be obtained, either explicitly or implicitly, from the scheduling information (e.g., the SCI) associated with the data transmission. In an embodiment, the ACK/NACK is transmitted using a particular format, which may facilitate reliable detection of the ACK/NACK by the source mobile device (i.e., the mobile device that is receiving the ACK/NACK in response to a prior transmission from the source mobile device).

While certain embodiments implement ACK/NACK feedback, the same or similar techniques may be used for other forms of feedback. For example, channel quality indicator (CQI), pre-coding matrix indicator (PMI), and rank indicator (RI) may be transmitted using the same resources used for ACK/NACK transmission. The use of the same resource technique for multiple types of feedback may facilitate efficient MCS adaptation, frequency selective scheduling, and the use of multiple-input multiple-output (MIMO) techniques.

Figure 13A:
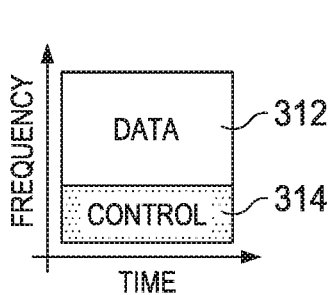
FIGS. 13A-B illustrate example frame structures for control and data multiplexing, according to certain embodiments of the present disclosure.
Figure 13B:
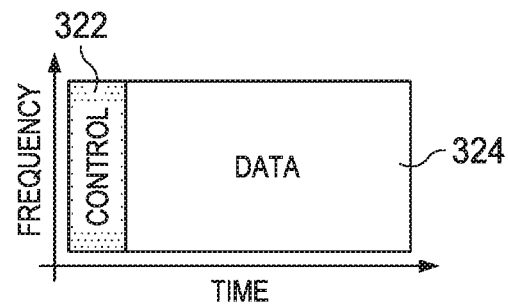

FIGS. 13A-B illustrate example frame structures for control and data multiplexing, according to certain embodiments of the present disclosure. In particular, FIGS. 13A-B illustrate two examples of control and data multiplexing. In frequency division multiplexing (FDM), illustrated by FIG. 13a, control region 314 (e.g., the PSCCH) is multiplexed with data region 312 (e.g., the PSSCH) in the frequency domain. In LTE, the starting resource location for the PSCCH is related to the sub-channel index. By configuration, a transmission pool for V2V is divided into m sub-channels. The source vehicle selects one of the m sub-channels, on its own or based on signaling by the base station (e.g., the eNB) in a DCI message, to use a particular sub-channel. The source vehicle places the PSSCH on a higher frequency than the PSCCH. In V2V, the PSCCH occupies two PRBs. In D2D, the PSCCH occupies one PRB, and there are fewer demodulation reference signals (DMRSs) for demodulating a D2D PSCCH, relative to a V2V PSCCH.

In time division multiplexing (TDM), illustrated by FIG. 13b, control region 322 (e.g., PSCCH) is multiplexed with data region 324 (e.g., PSSCH) in the time domain. For D2D, the PSCCH is transmitted at least four subframes before the PSSCH.

In another embodiment, the PSCCH and the PSSCH are transmitted on the same subframe.

FIG. 14 illustrates an example sequence of frames for D2D communication (sequence 342) and an example sequence of frames for V2V communication (sequence 344), according to certain embodiments of the present disclosure. After transmitting the data packet on the PSSCH, there may be a pool of resources pre-allocated for ACK/NACK transmission.

For D2D (e.g., sequence 342), the source mobile device (e.g., UE), which is in a coverage area of a base station (e.g., the eNB), receives a DCI from the base station in subframe 332. The source mobile device (e.g., UE) transmits the PSCCH in subframe 334. At least four subframes later in this example, the source mobile device (e.g., UE) transmits the PSSCH in subframe 346. Then, at least four subframes after transmitting the PSSCH in this example, the source mobile device (e.g., UE) receives an ACK/NACK in subframe 348 from the destination mobile device (e.g., UE). When the source mobile device (e.g., UE) is out of the coverage of the base station, the operation of receiving a DCI in subframe 332 might not be performed.

For V2V (e.g., sequence 344), the source vehicle, which is in a coverage area of a base station (e.g., the eNB), receives a DCI in subframe 330 from the base station. The source vehicle transmits the PSCCH and the PSSCH in subframe 338. Then, at least four subframes later in this example, the source vehicle receives the ACK/NACK in subframe 336. When the source vehicle is out of coverage of the base station (e.g., the eNB), the operation of receiving a DCI in subframe 330 might not be performed.

FIG. 15 illustrates an example sequence of frames in NR, according to certain embodiments of the present disclosure. In particular, FIG. 15 illustrates possible symbol sequence 350 within a subframe in NR. In an embodiment, the symbol location for an ACK/NACK is pre-defined. The first symbol, symbol 352, may be used for automatic gain control (AGC). Data symbols 354, which are one or more symbols following symbol 352, are for data and reference signal transmission. Symbol 356 may be a reserved symbol. Within a few symbols of the last data symbol 354, the receiving mobile device (e.g., UE) transmits an ACK/NACK in symbol 352. There may be another reserved symbol 358 after the ACK/NACK of symbol 352.

The base station (e.g., the eNB) may broadcast the configuration for the ACK/NACK pool in a system information block to all mobile devices (e.g., UEs) that are in a coverage area of the base station. The configuration may include the time relationship of the ACK/NACK pool to the shared channel pool and frequency resources of the ACK/NACK pool. The source mobile device (e.g., UE) may locate the specific ACK/NACK resource according to the location of the PSSCH. For example, when the PSSCH is transmitted on sub-channel 4, using zero-based numbering, for V2V, the ACK/NACK for the PSSCH may be the fifth PRB of the ACK/NACK pool.

In another example for mobile devices that are in a coverage area of a base station (e.g., the eNB), the base station may send the location of the ACK/NACK resources (e.g., time and frequency resources) in the DCI. The source mobile device (e.g., UE) may forward this location information of the ACK/NACK resources determined from the DCI in the SCI. An SCI format, which includes the location information, is transmitted by the source mobile device (e.g., UE). Also, the source mobile device (e.g., UE) may obtain the location of the ACK/NACK from the DCI.

Additionally or alternatively, the starting location of the ACK/NACK pool in frequency is transmitted by the base station (e.g., the eNB). When the PSCCH is transmitted on sub-channel 4, using zero-based numbering, for V2V, the ACK/NACK for the PSSCH may be the fifth PRB of the ACK/NACK pool.

For a mobile device (e.g., UE) that is out of the coverage area of a base station (e.g., eNB), the configuration of the ACK/NACK pool may be pre-configured. The pre-configured ACK/NACK pool may include the time relationship of the ACK/NACK pool to the shared channel pool and the frequency resources of the ACK/NACK pool. The source mobile device (e.g., UE) can locate the specific ACK/NACK resource according to the location of the PSCCH.

In another example for a mobile device (e.g., UE) that is out of the coverage area of a base station (e.g., eNB), a new SCI format including the location information of the ACK/NACK pool is transmitted by the source mobile device (e.g., UE). The source mobile device (e.g., UE) knows the location of the ACK/NACK for processing. In another embodiment, the starting location in frequency of the ACK/NACK pool is transmitted by the source mobile device (e.g., UE).

For more than one destination mobile device (e.g., UE), a code division multiplexing (CDM) approach may be used to multiplex the ACK/NACK from different mobile devices (e.g., UEs) on the same resource. Each destination mobile device (e.g., UE) within a group has a unique ID within the group (group member ID). Based on the unique group member ID, a CDMA code is selected. For example, for a 4-bit group member ID, the selected CDMA code may be a Hadamard sequence or another suitable error correction code. The message containing the ACK/NACK of the destination mobile device (e.g., UE) is transmitted on the time/frequency resources for the packet acknowledgement, and the message is spread with the CDMA code.

A power difference may exist between ACKs/NACKs received from different mobile devices (e.g., UEs) on the same resource. To reduce or eliminate near-far issues, open-loop power control may be used. In certain embodiments, the destination mobile device transmits the ACK or the NACK using open-loop power control, for example based on the received power level of the scheduling information (e.g., the SCI) or the data packet In an example of open-loop control, the transmit power $P_{CH}$ for the HARQ-ACK channel (for the destination mobile device) may be determined by: $P_{CH}=\min(P_{CMAX},\ PCH\_RECEIVED\_TARGET\_POWER+PL)$ [dBm], where $P_{CMAX}$ is the pre-configured UE transmit power and PL is the sidelink pathloss estimate. PCH_RECEIVED_TARGET_POWER is the pre-configured target to receive power on the sidelink for the channel. The path loss may be determined based on $P_{PSCCH}$, the transmit power of the PSCCH from the source mobile device, $M_{PSCCH}$, the number of resources used for PSCCH, and possibly (pre-)configuration terms $P_0$ and $\alpha$:

$$P_{PSCCH}=\min\{P_{CMAX}, 10\ \log_{10}(M_{PSCCH})+P_0+\alpha\cdot PL\}.$$

In some scenarios, an indication of $P_{PSCCH}$ is signaled in the SCI, for example as a bit field indicating power level.

When a destination mobile device (e.g., UE) belongs to two or more groups, it may transmit an ACK/NACK for two or more received PSSCHs in the same subframe. While the destination mobile device (e.g., UE) is under network control, the base station (e.g., the eNB) assigns disjoint resources for different groups to prevent collisions. For distributed transmission when the mobile device (e.g., UE) is not under network control, the ACK/NACK transmission may be based on any suitable combination of priority, latency, and power, where the higher power message is transmitted first. When priority is used, the higher priority message is acknowledged first. Priority may be a field in the scheduling information (e.g., SCI).

When the ACK/NACK pool immediately follows the transmission of a PSSCH, for example the ACK/NACK pool is four subframes after the PSSCH, the system capacity may be limited. For example, for V2V, a retransmission of a PSSCH may be 1 to 15 subframes after the initial transmission. An ACK/NACK following four subframes after the PSSCH may cause the retransmission to occur every other subframe from sub-frame 2 until subframe 30. In one embodiment, in NR, one symbol for the ACK/NACK pool is at the end of the subframe, and the source mobile device (e.g., UE) indicates the location of the ACK/NACK.

In certain embodiments, priority rules that indicate the priority of sidelink transmissions relative to uplink transmissions may exist. A destination mobile device (e.g., UE) may send an uplink transmission instead of transmitting an ACK/NACK on the sidelink, with the possibility that the ACK/NACK is never transmitted.

Similarly, a source mobile device (e.g., UE) may send an uplink transmission instead of receiving an ACK/NACK on the sidelink. The source mobile device (e.g., UE) may decide to retransmit when there are more opportunities to retransmit the data. When there are not more opportunities to retransmit the data, a new message may be transmitted in the future. There may be some modifications for group management due to the absence of an ACK/NACK.

Due to changes in frame configuration, for example TDD, the ACK/NACK is not transmitted at n+4. In certain embodiments, there may be a priority for receiving an ACK/NACK over transmitting an ACK/NACK.

In certain embodiments, the destination mobile device transmitting the ACK or the NACK may include transmitting a waveform, the waveform indicating the ACK or the NACK and channel quality. As a first example, the ACK/NACK indicator may be one bit, as illustrated by Table 1, with one symbol within a PRB used. In such an example, twelve resource elements are available to map the ACK/NACK indicator to the waveform or signal. In Table 1, a value of 0 indicates a NACK and indicates that the destination mobile device (e.g., UE) is unable to decode the PSSCH. Further, in Table 1, a value of 1 indicates an ACK for successful decoding of the PSSCH. The ACK/NACK bit may be mapped into a waveform, for example a quadrature phase-shift keying (QPSK) waveform or Zadoff-Chu waveform. Additionally, there may be multiplication of the signal by a Walsh waveform (+1, −1).

TABLE 1

| Value | Indication |
|---|---|
| 0 | NACK: unable to decode PSSCH |
| 1 | ACK: successful decoding of PSSCH |

As another example, the feedback may include an ACK/NACK and a measure of the channel quality. In an embodiment, two bits are used for the feedback, where the first bit indicates the ACK/NACK, given by Table 1, above, and the second bit indicates the channel quality, given by Table 2, below. A value of 0 for the indicator of channel quality indicates that the channel quality is below a (pre-)configured threshold and a value of 1 for the indicator of channel quality indicates that the channel quality is above the (pre-)configured threshold. The measured value used to determine the indicator of channel quality may be the received signal strength of the PSCCH. In one embodiment, each bit is individually modulated. In another embodiment, the two bits are jointly mapped in a waveform indicated by Table 3. The patterns "xxxx," "wwww," "yyyy," and "zzzz" may be bit mappings corresponding to a particular waveform or to an actual waveform.

TABLE 2

| 0 | Below threshold |
|---|---|
| 1 | Above threshold |

TABLE 3

| b1 b0 | Waveform pattern |
|---|---|
| "00" | xxxx xxxx xxxx xxxx xxxx xxxx |
| "01" | wwww wwww wwww wwww wwww wwww |
| "10" | yyyy yyyy yyyy yyyy yyyy yyyy |
| "11" | zzzz zzzz zzzz zzzz zzzz zzzz |

FIG. 16 illustrates an example frame structure in which ACKs/NACKs are placed around demodulation reference signals (DMRSs), according to certain embodiments of the present disclosure. Placing ACKs/NACKs around reference signals may indicate to the mobile device receiving the ACK/NACK where to look for the ACK/NACK.

The ACK/NACK channel, for example the PSHICH, may be placed in a variety of locations. When a DMRS exists, the ACK/NACK channel may be placed around the DRMS, as illustrated by FIG. 16. V2V subframe layout 360 contains four DMRS symbols 362. For sixteen possible members of a group, there may be a mapping of location (time) and Walsh code (cover code, Hadamard code). For example, when the group member ID of the destination mobile device is m, the location (364, 366, 368, 369) may be m mod 4. Table 4, below, illustrates an example set of cover codes. The source mobile device (e.g., UE) may determine the group member ID of the destination mobile device (e.g., UE) by identifying the location of the waveform and the cover code. Alternatively, in an example where the time indices t range from 0 and $N_{max}^T-1$, where $N_{max}^T=4$ ACK/NACK resources per subframe, the time index t can be determined from the group member ID m of the destination mobile device using the relationship $t=\lfloor m/N_{max}^T \rfloor$. t=0 corresponds to 364, t=1 corresponds to 366, t=2 corresponds to 368, and t=3 corresponds to 369. The code index c may be computed in a similar manner, using the maximum number of code resources $N_{max}^c$ per time resource, $c=m \bmod N_{max}^c$. When there are $N_{max}^c=4$ per time resource and $N_{max}^T=4$, then a maximum of $N_{max}^c N_{max}^T$ group member IDs are possible.

TABLE 4

| Index | Pattern |
|---|---|
| "00" | +1 +1 +1 +1 . . . |
| "01" | +1 −1 +1 −1 . . . |
| "10" | +1 −1 −1 +1 . . . |
| "11" | +1 +1 −1 −1 |

FIGS. 17A-B illustrate examples of multiplexing of the ACK/NACK pool in the frequency domain, according to certain embodiments of the present disclosure. In FDM, the ACK/NACK pool may be multiplexed in the frequency domain. In frame structure 370, illustrated by FIG. 17a, ACK/NACK pool 374 is between control region 376 and data region 372 in the frequency domain. FIG. 17b, illustrates frame structure 380, where ACK/NACK pool 382 is after data region 384 and control region 386 in the frequency domain. Although FIGS. 17a-b illustrate the control pool to be adjacent to the control region and/or to the data region, the ACK/NACK pool may contain adjacent or non-adjacent frequency resources, such as PRBs or sub-carriers. In one embodiment, the ACK/NACK pool is present on all time resources. Alternatively, the ACK/NACK pool is not present on all time resources.

In an embodiment, the ACK/NACK pool is signaled using dedicated or common radio resource control (RRC) signaling. The ACK/NACK pool signaling may include frequency resources, time resources, or other parameters, such as transmission power. Additionally, a bitmap of subframes may be transmitted to indicate on which subframes transmission is acknowledged, and on which subframes transmission is not acknowledged. This information may be explicit or implicit. An example of implicit indication on which subframes transmission is acknowledged is that an absence of an ACK/NACK resource pool indicates that the transmission does not use HARQ. When the ACK/NACK resource pool is unoccupied, the resources of the ACK/NACK pool may be used for data or SCI transmission.

FIGS. 18A-B illustrate example ACK/NACK pools, according to certain embodiments of the present disclosure. FIG. 18a illustrates frame structure 390, where ACK/NACK pool 394 is time multiplexed in control region 396, below data region 392. The frequency resources of ACK/NACK pool 394 are the same as the frequency resources of control region 396, and the time resources of ACK/NACK pool 394 are different than the time resources of control region 396. ACK/NACK pool 394 may be communicated in a different message than control region 396. In another example, ACK/NACK pool 394 is communicated on the same message but in a different field as control region 396.

FIG. 18b illustrates frame structure 400 with ACK/NACK pool 404 ordered in a sub-channel like configuration. ACK/NACK pool 404 is sandwiched between multiple control regions 402 and data regions 406. This sub-channel like configuration is useful when the sidelink transmission uses adjacent control and data transmissions.

In an embodiment, a bit indicator in the SCI indicates the presence or absence of the ACK/NACK pool. In V2V, the ordering in frequency (e.g., PRB) is from lowest frequency to highest frequency. The control (e.g., PSCCH) is placed first, followed by the data (e.g., PSSCH). The resource allocation field within the SCI, which is carried by the PSCCH, indicates the number of PRBs for the PSSCH. The SCI may be augmented with a bit field, where a value of "0" indicates an absence of an ACK/NACK pool for this mobile device (e.g., UE) and a value of "1" indicates the presence of an ACK/NACK pool for this mobile device (e.g., UE). Alternatively, a value of "1" indicates an absence of an ACK/NACK pool for this mobile device (e.g., UE) and a value of "0" indicates the presence of an ACK/NACK pool for this mobile device (e.g., UE). The number of resources for the ACK/NACK pool may be fixed. In another embodiment, the bit field contains n bits, and indicates the number of PRBs for the ACK/NACK pool. In an embodiment where n=2, "00" indicates the absence of an ACK/NACK pool, a value of "01" indicates one PRB in the ACK/NACK pool, a value of "10" indicates two PRBs in the ACK/NACK pool, and a value of "11" indicates three PRBs in the ACK/NACK pool. When the ACK/NACK pool is present, the number of PRBs for the PSSCH indicated by the resource allocation field is reduced by the size of the ACK/NACK pool.

FIG. 19 illustrates an example frame structure 410, according to certain embodiments of the present disclosure. In TDM, as illustrated by frame structure 410, ACK/NACK pool 414 is between control region 412 and data region 416 in the time domain. In the example shown in FIG. 19, ACK/NACK pool 414 is shown as adjacent to control region 412, but ACK/NACK pool 414 may be not adjacent to control region 412. In one embodiment, the ACK/NACK pool is present in all resources. Alternatively, in certain embodiments, the ACK/NACK pool is not present on all time resources. In certain embodiments, the ACK NACK pool may occupy only some of the available frequency resources, which may be adjacent or non-adjacent.

Dedicated or common RRC signaling may be used to indicate the ACK/NACK pool. The ACK/NACK pool signaling may include frequency resources, time resources, or other parameters, such as transmission power. Additionally, a bitmap of subframes may be transmitted to indicate on which subframes transmission is acknowledged, and on which subframes transmission is not acknowledged. This information may be explicit or implicit. An example of implicit indication on which subframes transmission is acknowledged is that an absence of an ACK/NACK resource pool indicates that the transmission does not use HARQ. When the ACK/NACK resource pool is unoccupied, the resources of the ACK/NACK pool may be used for data or SCI transmission. A bitmap of subframes may be transmitted, indicating on which subframes transmission is acknowledged, and on which subframes transmission is not acknowledged.

In certain embodiments, the control region and ACK/NACK pool are multiplexed in the same pool or zone. This multiplexing may be in the time domain or in the frequency domain.

FIG. 20 illustrates a flowchart of an example method 490 of ACK/NACK transmission performed by a destination mobile device, according to certain embodiments of the present disclosure. The destination mobile device may be a UE in D2D or a vehicle in V2V. In block 492, the destination mobile device receives scheduling information (e.g., an SCI) from a source mobile device on control resources. The control resources may be on the PSCCH. In other words, the scheduling information may be received on the PSCCH. The scheduling information is associated with a data packet. As described above, the scheduling information may include transmission information for transmitting a data packet by the source mobile device, and the scheduling information may include an indication of ACK/NACK resources associated with the data packet. The destination mobile device processes the scheduling information (e.g., the SCI) to determine whether to look for the data packet and how to respond (if at all).

Additionally, in block 492, the destination mobile device receives the data packet from the source mobile device on the resources indication by the transmission information from the scheduling information. For example, the destination mobile device may receive the data packet on a PSSCH. Using the processed SCI, the destination mobile device attempts to decode the data received on the PSSCH, and processes the PSSCH.

In block 494, the destination mobile device determines the location in a transmission for transmitting the ACK/NACK. In certain embodiments, the scheduling information indicates the location for the ACK/NACK transmission, on the PSHICH for example. In another embodiment, the resources of the PSSCH indicate the location of the ACK/NACK.

In block 496, the destination mobile device transmits an ACK or a NACK to the source mobile device on the resources determined in block 494. When the PSSCH is properly received in block 492, the destination mobile device transmits an ACK. On the other hand, when the PSSCH is not properly received in block 492, the destination mobile device transmits a NACK.

Figure 21:
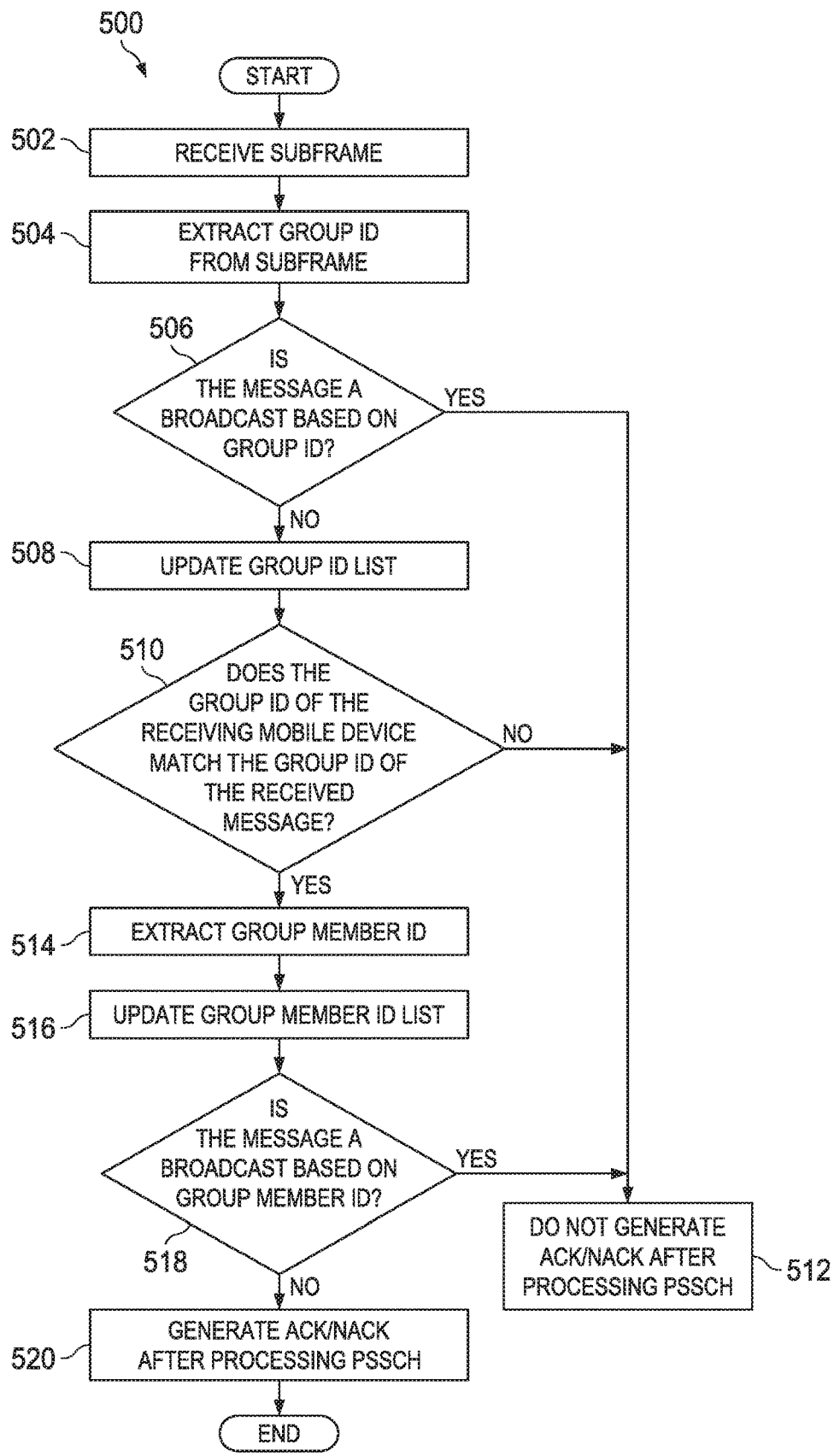
FIG. 21 illustrates a flowchart of an example method of determining whether to transmit an ACK/NACK, performed by a destination mobile device, according to certain embodiments of the present disclosure.

FIG. 21 illustrates a flowchart of an example method 500 of determining whether to transmit an ACK/NACK, performed by a destination mobile device, according to certain embodiments of the present disclosure. The destination mobile device may be a UE in D2D or a vehicle in V2V.

In block 502, the destination mobile device receives a subframe from a source mobile device. The subframe includes scheduling information (e.g., an SCI), which may include a group ID. In block 504, the destination mobile device extracts the group ID from the subframe. For example, the destination mobile device extracts the group ID from the scheduling information (e.g., the SCI) of the subframe. As described further below, the group ID may be used by the destination mobile device to determine whether transmission of an ACK/NACK is appropriate. Although a group ID is described, the present disclosure contemplates using other fields of the scheduling information (e.g., SCI), or even other portions of the subframe, to determine whether transmission of an ACK/NACK is appropriate.

In block 506, based on the group ID extracted in block 504, the destination mobile device determines whether the data packet is sent as a broadcast message. For example, based on the group ID extracted in block 504, the destination mobile device determines whether the PSSCH is a broadcast message. Based at least in part on determining that the data packet (e.g., the PSSCH) is a broadcast message, the destination mobile device proceeds to block 512 and does not generate an ACK/NACK after processing the data packet (e.g., the PSSCH). On the other hand, based at least in part on determining that the data packet (e.g., the PSSCH) is not a broadcast message, the destination mobile device proceeds to block 508.

In block 508, based on the group ID extracted from the message, the destination mobile device updates the group ID list. For example, the destination mobile device maintains a list of group IDs and, for each group ID, a list of the group members. In block 510, the destination mobile device determines whether the group ID of the destination mobile device matches the group ID of the received message. Based at least in part of determining that the group ID of the destination mobile device does not match the group ID of the received message, the destination mobile device proceeds to block 512, and does not generate an ACK/NACK after processing the data packet (e.g., the PSSCH). Returning to block 510, based at least in part on determining that the group ID of the destination mobile device matches the group ID of the received message, the destination mobile device proceeds to block 514.

In block 514, the destination mobile device extracts the group member ID. In block 516, the destination mobile device updates the group member ID list based on the extracted group member ID. In block 518, based at least in part on the group member ID, the destination mobile device determines whether the message is a broadcast message. Based at least in part on determining that the message is a broadcast message, the destination mobile device proceeds to block 512 and does not generate an ACK/NACK after processing the data packet (e.g., the PSSCH). On the other hand, based at least in part on determining that the message is not a broadcast message, the destination mobile device proceeds to block 520 and generates an ACK/NACK after processing the data packet (e.g., the PSSCH). In other words, upon determining that the data packet is groupcast, the destination mobile device transmits to the source mobile device an ACK or a NACK on the ACK/NACK resources indicated by the scheduling information (e.g., the SCI) transmitted by the source mobile device on the control resources (e.g., the PSCCH).

In one particular example, the destination mobile device belongs to a group having a group ID of "1111 1111" in binary or 0xFF in hexadecimal. The destination mobile device, on subframe n, receives the list of group IDs 0xDE, 0xAD, and 0xFF. The destination mobile device updates the list of group IDs with 0xDE, 0xAD, and 0xFF. Additionally, a counter, for example a pre-configured group ID counter value, is set. As a particular example, for each group ID, the destination mobile device sets a counter to a pre-configured group counter value (e.g., 10). On the next subframe, n+1, the destination mobile device receives the group IDs 0xAD and 0xAB. The destination mobile device adds 0xAB to the list of group IDs and sets the counter for 0xAB to the group counter value. Additionally, the destination mobile device sets the counter for the group ID 0xAD to the group counter value. For other group IDs in the list, 0xDE and 0xFF, each counter is decremented by one. When a counter reaches the value of zero, the group ID is removed from the list. This allows for the reuse of group IDs.

In subframe n, for the specific group 0xFF, the destination mobile device updates the list of group members in a similar manner. For each group member ID received, the list may be augmented by that group member ID when that group member ID is not yet on the list. Additionally, a counter, for example a pre-configured group member counter value, is set. For the other group member IDs on the list, each counter is decremented by one in that subframe. When a counter reaches zero, the group member ID is removed from the group member ID list. The length of the list may indicate the number of ACKs to be expected when the destination mobile device is acting as a source mobile device for the group. When the destination mobile device does not have a group member ID, the destination mobile device can select an unused group member ID, for example pseudo-randomly.

The destination mobile device may also note the received power of the scheduling information (e.g., the PSCCH) or the data packet (e.g., PSSCH). When the transmit power of the PSCCH is known, the transmit power for the ACK/NACK response may be selected using open-loop techniques, as described above. For example, the estimated pathloss is related to the received power minus the transmitted power. The open-loop technique may also use the number of PRBs that the PSCCH or the PSSCH occupies.

Figure 22:
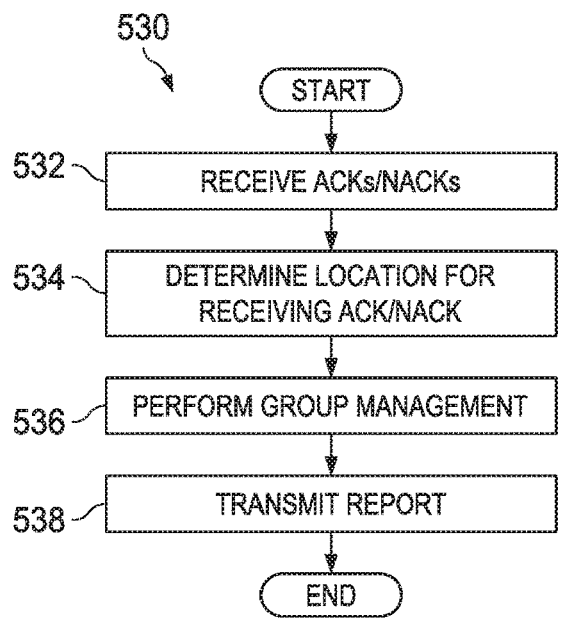
FIG. 22 illustrates a flowchart of an example method of reacting to ACKs/NACKs, performed by a source mobile device, according to certain embodiments of the present disclosure.

FIG. 22 illustrates a flowchart of an example method 530 of reacting to ACKs/NACKs, performed by a source mobile device, according to certain embodiments of the present disclosure. For example, the source mobile device may react to receiving the PSHICH. In block 532, the source mobile device receives ACKs/NACKs on ACK/NACK resources (e.g., in the ACK/NACK pool). In block 534, the source mobile device examines the ACK/NACK pool for ACK/NACK transmissions to determine the identity of the destination mobile devices that transmitted the ACKs and NACKs, for example by processing the spreading/cover code and location of the ACK/NACK.

In block 536, the source mobile device performs group management. In certain embodiments, the source mobile device decrements the group member ID counter for mobile devices that are part of the group. For each detected ACK/NACK, the source mobile device determines the member ID y. When ID y is already on the group member ID list, the source mobile device resets the counter for the group member ID. When the ID y is not already on the group member ID list, the source mobile device adds ID y to the list of group member IDs and resets the counter for the group. The source mobile device also logs the ACK/NACK response. When a group member counter reaches zero, the source mobile device removes the corresponding mobile devices from the list. When the number of ACK/NACKs received is fewer than the expected number, for example the number of mobile devices with non-zero valued counters, the source mobile device may retransmit the message (e.g., the data packet on the PSSCH), when the retransmission counter has not been reached. When the retransmission counter is reached, the source mobile device may change the transmission characteristics, for example the MCS, the power level, the resources used, and/or other suitable characteristics, so future transmissions will be reliably received. When the expected number of ACKs/NACKs are received, the source mobile device may use a higher MCS level, less power, or fewer resources for future transmission.

In block 538, the source mobile device transmits a report indicating the transmission quality to a base station (e.g., an eNB), when the source mobile device is in a coverage area of the base station.

Table 5 illustrates an embodiment where a two bit indicator (b1 b0) for sidelink channel quality is used by the source mobile device to report the transmission quality to the base station. A value of 00 indicates a NACK with poor channel quality. The source mobile device retransmits when appropriate. Additionally, the source mobile device boosts power and lowers MCS for future transmissions. A value of 01 indicates an ACK, but poor channel quality. For future transmissions, more power may be used. A value of 10 indicates a NACK with good channel quality. The source mobile device retransmits when appropriate. A less aggressive MCS may be used. A value of 11 indicates an ACK with good channel quality. More aggressive MCS or lower power may be used for future transmissions.

TABLE 5

| 00 | NACK, poor channel quality | Retransmit when appropriate. For future transmissions, boost power, lower MCS |
|---|---|---|
| 01 | ACK, poor channel quality | For future transmissions, may need more power |
| 10 | NACK, good channel quality | Retransmit when appropriate. May use less aggressive MCS |
| 11 | ACK, good channel quality | More aggressive MCS or lower power could be used in future |

FDM operation may be symmetric or asymmetric. In symmetric operation, a one-to-one correspondence between packet transmission and acknowledgement (ACK/NACK) exists. For each transmitted packet, a resource within the ACK/NACK resource pool is allocated for sending the ACK/NACK. To receive the ACK/NACK, the source mobile device will not schedule other packet transmissions at the time it expects to receive the ACK/NACK, which constrains the source mobile device.

In one embodiment, with a dedicated resource for the ACK/NACK pool, so at the time of the dedicated resources no data or SCI transmissions are scheduled. For example, the last symbol of the subframe may be reserved for ACK/NACK transmission, with no data or SCI transmission. A guard time around that symbol may be used.

Figure 23:
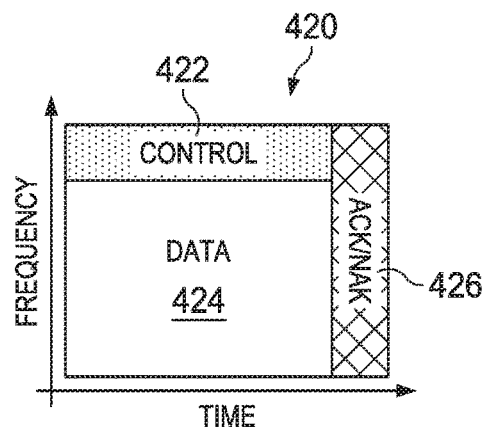
FIG. 23 illustrates an example frame multiplexing structure, according to certain embodiments of the present disclosure.

FIG. 23 illustrates an example frame multiplexing structure 420, according to certain embodiments of the present disclosure. In particular, FIG. 23 illustrates frame 420 with an embodiment multiplexing structure for a dedicated time slot (symbol) for ACK/NACK in ACK/NACK 426. Frame 420 includes control region 422 and data region 424.

In another embodiment, multiplexing rules are used for ACK/NACK transmissions, so ACK/NACKs are sent at the same time, as in asymmetric operation.

In asymmetric operation, a one-to-one correspondence between packet transmission and acknowledgement may or may not exist. There are fewer resources in the ACK/NACK resource pool than in the SCI resources. A given ACK/NACK resource may acknowledge multiple packets. In one embodiment, multiplexing rules may be used. The ACK/NACKs may be transmitted in the order that the corresponding packets were received. However, this may cause confusion, for example when a packet is not received because the corresponding SCI has not been received, and the destination mobile device has not acknowledged that packet, leading to incorrectly multiplexing the ACK/NACK for other packets. One technique for reducing or eliminating this confusion and incorrect multiplexing is for the destination mobile device to transmit the packet ID of packets it attempted to decode. This technique, however, may lead to a high overhead. To reduce the overhead, the source mobile device may include a short logical ID, for example three bits, for each packet in the SCI. The destination mobile device may send the logical IDs for the packet for which an SCI was received, along with the ACK/NACK.

In another embodiment, the ACK/NACK may be sent using rules similar to LTE TDM rules. The subframes are partitioned, for example based on absolute timing.

In TDM, there may be many more data/SCI resources than ACK/NACK resources, and multiplexing rules may be used. The SCI and/or the data resources may be logically indexed, for example using the transmit point index.

When the data pool size is large, multiple mobile devices may need to transmit an ACK/NACK in the same ACK/NACK pool, which may cause issues, because both mobile devices need to listen and transmit at the same time, on the same ACK/NACK pool. Priority rules may state that a mobile device that has received a packet in a given data pool cannot transmit on any resource that would lead to an ACK in the same ACK/NACK pool. In another embodiment, the mobile device that has received a packet in a given data pool can still transmit in the same data pool, but acknowledges the received packet by sending the ACK/NACK in an SCI, either for scheduling its transmission or in another SCI. Because that mobile device has already transmitted its ACK/NACK, it can listen to the ACK/NACK for its own packets in the ACK/NACK resource pool.

There are several options for ACK/NACK utilization when a mobile device can transmit on multiple carriers. The mobile device may transmit ACK/NACK on an anchor carrier, and multiplexing rules are used for multiple carriers. The multiplexing rules may be similar to the multiplexing rules for PUCCH format 3 in LTE. In another embodiment, a packet is acknowledged on the same carrier on which it is received. For example, a packet received on carrier A is acknowledged on carrier A. This involves transmission on multiple carriers at the same time, but enables different devices to have different carrier configurations.

Figure 24:
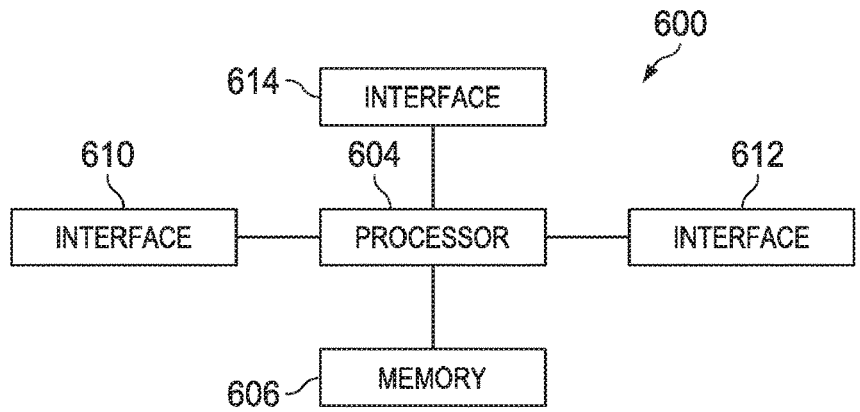
FIG. 24 illustrates a block diagram of an example processing system, according to certain embodiments of the present disclosure.

FIG. 24 illustrates a block diagram of an example processing system 600, according to certain embodiments of the present disclosure. Processing system 600 may be configured to perform methods described in this disclosure, and may be installed in a host device. As shown, processing system 600 includes a processor 604, a memory 606, and interfaces 610-614, which may (or may not) be arranged as shown in FIG. 24. Processor 604 may be any component or collection of components adapted to perform computations and/or other processing related tasks, and the memory 606 may be any component or collection of components adapted to store programming and/or instructions for execution by processor 604. In an embodiment, memory 606 includes a non-transitory computer readable medium. The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In some embodiments, processing system 600 is included in a network device that is accessing, or part otherwise of, a telecommunications network. In one example, processing system 600 is in a network-side device in a wireless or wireline telecommunications network, such as a base station, a relay station, a scheduler, a controller, a gateway, a router, an applications server, or any other device in the telecommunications network. In other embodiments, processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 25:
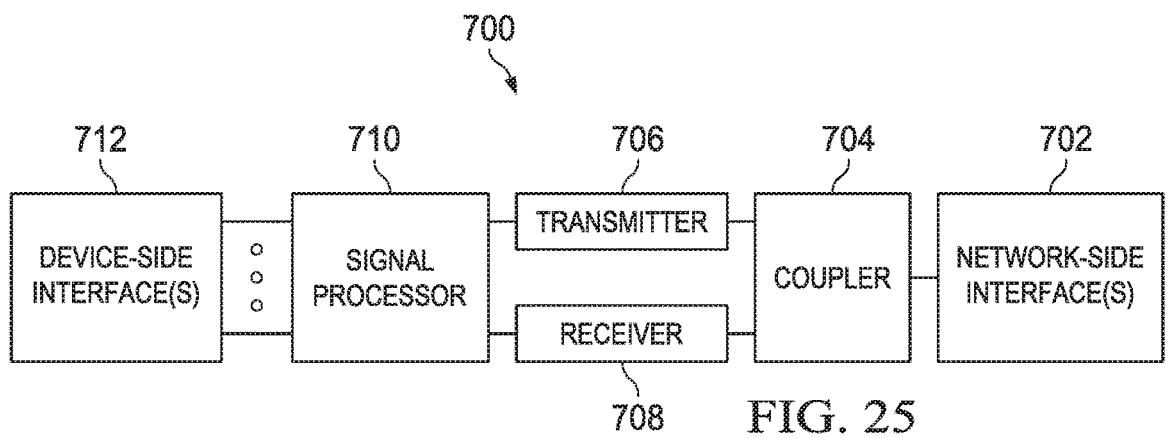
FIG. 25 illustrates a block diagram of an example transceiver, according to certain embodiments of the present disclosure.

FIG. 25 illustrates a block diagram of an example transceiver 700, according to certain embodiments of the present disclosure. Transceiver 700 is adapted to transmit and receive signals over a telecommunication network. In some embodiments, one or more of interfaces 610, 612, 614 shown in and described with reference to FIG. 25 connects processing system 600 to a transceiver (e.g., transceiver 700) adapted to transmit and receive signaling over the telecommunications network. The transceiver 700 may be installed in a host device. As shown, transceiver 700 comprises a network-side interface 702, a coupler 704, a transmitter 706, a receiver 708, a signal processor 710, and a device-side interface 712. Network-side interface 702 may include any component or collection of components adapted to transmit or receive signaling over a wireless or wireline telecommunications network. Coupler 704 may include any component or collection of components adapted to facilitate bi-directional communication over network-side interface 702. Transmitter 706 may include any component or collection of components (e.g., up-converter, power amplifier, etc.) adapted to convert a baseband signal into a modulated carrier signal suitable for transmission over network-side interface 702. Receiver 708 may include any component or collection of components (e.g., down-converter, low noise amplifier, etc.) adapted to convert a carrier signal received over network-side interface 702 into a baseband signal. Signal processor 710 may include any component or collection of components adapted to convert a baseband signal into a data signal suitable for communication over device-side interface(s) 712, or vice-versa. Device-side interface(s) 712 may include any component or collection of components adapted to communicate data-signals between signal processor 710 and components within the host device (e.g., processing system 600, local area network (LAN) ports, etc.).

Transceiver 700 may transmit and receive signaling over any type of communications medium. In some embodiments, transceiver 700 transmits and receives signaling over a wireless medium. For example, transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, network-side interface 702 comprises one or more antenna/radiating elements. For example, network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method comprising:
    transmitting, by a first mobile device, sidelink control information (SCI) to a second mobile device over a physical sidelink control channel (PSCCH), a location of PSCCH resource(s) carrying the SCI identifying location(s) of acknowledgement (ACK)/negative acknowledgement (NACK) resource(s) associated with a data packet scheduled for transmission over a physical sidelink shared channel (PSSCH);
    transmitting, by the first mobile device, the data packet over the PSSCH to a second mobile device; and
    monitoring, by the first mobile device, the ACK/NACK resource(s) for an ACK/NACK indication associated with the data packet from the second mobile device.

2. The method of claim 1, wherein the first mobile device is a vehicular user equipment (UE).

3. The method of claim 1, further comprising:
    selecting, by the first mobile device, the ACK/NACK resource(s) from a pool of ACK/NACK resource(s) based on a downlink control indicator (DCI) message received from a base station.

4. The method of claim 1, further comprising receiving an ACK indication from the second device over the ACK/NACK resource(s), the ACK indication indicating successful reception of the data packet by the second mobile device.

5. The method of claim 1, wherein the ACK/NACK resource(s) are adjacent to a demodulation reference signal (DMRS).

6. The method of claim 1, wherein time-domain resource location(s) of the PSCCH resource(s) carrying the SCI identify time-domain resource location(s) of the ACK/NACK resources associated with the data packet scheduled for transmission over the PSSCH.

7. The method of claim 1, wherein frequency-domain resource location(s) of the PSCCH resource carrying the SCI identifies frequency-domain resource location(s) of the ACK/NACK resources associated with the data packet scheduled for transmission over the PSSCH.

8. The method of claim 1, wherein time-frequency resource location(s) of the PSCCH resource(s) carrying the SCI identifies time-frequency resource location(s) of the ACK/NACK resource(s) associated with the data packet scheduled for transmission over the PSSCH.

9. A first mobile device comprising:
    a processor; and
    a non-transitory computer readable storage medium storing programming for execution by the processor, the programming including instructions to:
        transmit sidelink control information (SCI) to a second mobile device over a physical sidelink control channel (PSCCH), location(s) of PSCCH resource(s) carrying the SCI identifying location(s) of acknowledgement (ACK)/negative acknowledgement (NACK) resource(s) associated with a data packet scheduled for transmission over a physical sidelink shared channel (PSSCH);
        transmit the data packet over the PSSCH to a second mobile device; and
        monitor the ACK/NACK resource(s) for an ACK/NACK indication associated with the data packet from the second mobile device.

10. The first mobile device of claim 9, wherein the first mobile device is a vehicular user equipment (UE).

11. The first mobile device of claim 9, wherein the programming further includes instructions to:
    select the ACK/NACK resource(s) from a pool of ACK/NACK resources based on a downlink control indicator (DCI) message received from a base station.

12. The first mobile device of claim 9, wherein the programming further includes instructions to:
    receive an ACK indication from the second device over the ACK/NACK resource(s), the ACK indication indicating successful reception of the data packet by the second mobile device.

13. The first mobile device of claim 9, wherein the ACK/NACK resource(s) are adjacent to a demodulation reference signal (DMRS).

14. The first mobile device of claim 9, wherein time-domain resource location(s) of the PSCCH resource(s) carrying the SCI identifies time-domain resource location(s) of the ACK/NACK resource(s) associated with the data packet scheduled for transmission over the PSSCH.

15. The first mobile device of claim 9, wherein frequency-domain resource location(s) of the PSCCH resource(s) carrying the SCI identifies frequency-domain resource location(s) of the ACK/NACK resource(s) associated with the data packet scheduled for transmission over the PSSCH.

16. The first mobile device of claim 9, wherein time-frequency resource location(s) of the PSCCH resource carrying the SCI identifies time-frequency resource location(s) of the ACK/NACK resources associated with the data packet scheduled for transmission over the PSSCH.

17. A method comprising:
receiving, by a second mobile device, sidelink control information (SCI) from a first mobile device over a physical sidelink control channel (PSCCH), location(s) of PSCCH resource(s) carrying the SCI identifying location(s) of an acknowledgement (ACK)/negative acknowledgement (NACK) resource(s) associated with a data packet scheduled for transmission over a physical sidelink shared channel (PSSCH);
receiving, by the second mobile device, the data packet over the PSSCH from the first mobile device; and
transmitting, by the first mobile device, an ACK or NACK indication over the ACK/NACK resource(s) associated with the data packet to the first mobile device.

18. The method of claim 17, wherein the second mobile device is a vehicular user equipment (UE).

19. The method of claim 17, wherein the ACK/NACK resource(s) are adjacent to a demodulation reference signal (DMRS).

20. The method of claim 17, wherein time-domain resource location(s) of the PSCCH resource(s) carrying the SCI identifies time-domain resource location(s) of the ACK/NACK resource(s) associated with the data packet scheduled for transmission over the PSSCH.

21. The method of claim 17, wherein frequency-domain resource location(s) of the PSCCH resource(s) carrying the SCI identifies frequency-domain resource location(s) of the ACK/NACK resource(s) associated with the data packet scheduled for transmission over the PSSCH.

22. The method of claim 17, wherein time-frequency resource location(s) of the PSCCH resource(s) carrying the SCI identifies time-frequency resource location(s) of the ACK/NACK resource(s) associated with the data packet scheduled for transmission over the PSSCH.

23. A second mobile device comprising:
a processor; and
a non-transitory computer readable storage medium storing programming for execution by the processor, the programming including instructions to:
receive sidelink control information (SCI) from a first mobile device over a physical sidelink control channel (PSCCH), location(s) of PSCCH resource(s) carrying the SCI identifying location(s) of acknowledgement (ACK)/negative acknowledgement (NACK) resource(s) associated with a data packet scheduled for transmission over a physical sidelink shared channel (PSSCH);
receive the data packet over the PSSCH from the first mobile device; and
transmit an ACK or NACK indication over the ACK/NACK resource(s) associated with the data packet to the first mobile device.

24. The second mobile device of claim 23, wherein the second mobile device is a vehicular user equipment (UE).

25. The second mobile device of claim 23, wherein the ACK/NACK resource(s) are adjacent to a demodulation reference signal (DMRS).

26. The second mobile device of claim 23, wherein time-domain resource location(s) of the PSCCH resource(s) carrying the SCI identifies time-domain resource location(s) of the ACK/NACK resource(s) associated with the data packet scheduled for transmission over the PSSCH.

27. The second mobile device of claim 23, wherein a frequency-domain resource location(s) of the PSCCH resource(s) carrying the SCI identifies a frequency-domain resource location(s) of the ACK/NACK resource(s) associated with the data packet scheduled for transmission over the PSSCH.

28. The second mobile device of claim 23, wherein time-frequency resource location(s) of the PSCCH resource(s) carrying the SCI identifies time-frequency resource location(s) of the ACK/NACK resource(s) associated with the data packet scheduled for transmission over the PSSCH.

* * * * *